US007521671B2

(12) United States Patent

Kirihara et al.

(10) Patent No.: US 7,521,671 B2
(45) Date of Patent: Apr. 21, 2009

(54) LASER IONIZATION MASS SPECTROSCOPE

(75) Inventors: Naotoshi Kirihara, Tokyo (JP); Norifumi Kitada, Tokyo (JP); Kenji Takahashi, Tokyo (JP); Haruaki Yoshida, Tokyo (JP); Mizuho Tanaka, Tokyo (JP); Yasuo Suzuki, Tokyo (JP)

(73) Assignee: Kabushiki Kaisha IDX Technologies, Tokyo (JP)

( * ) Notice: Subject to any disclaimer, the term of this patent is extended or adjusted under 35 U.S.C. 154(b) by 301 days.

(21) Appl. No.: 10/593,091

(22) PCT Filed: Mar. 15, 2005

(86) PCT No.: PCT/JP2005/004521

§ 371 (c)(1), (2), (4) Date: Dec. 13, 2006

(87) PCT Pub. No.: WO2005/088294

PCT Pub. Date: Sep. 22, 2005

(65) Prior Publication Data

US 2007/0272849 A1 Nov. 29, 2007

(30) Foreign Application Priority Data

Mar. 16, 2004 (JP) ............................ 2004-074557
Mar. 16, 2004 (JP) ............................ 2004-074558
Mar. 16, 2004 (JP) ............................ 2004-074559
Sep. 3, 2004 (JP) ............................ 2004-257696

(51) Int. Cl.
*H01J 49/00* (2006.01)
*B01D 59/44* (2006.01)
*G01N 1/00* (2006.01)

(52) U.S. Cl. ....................... 250/288; 250/281; 250/282; 73/863.02; 73/863.86

(58) Field of Classification Search ................. 250/281, 250/282, 288; 73/863.02, 863.86, 864.81
See application file for complete search history.

(56) References Cited

U.S. PATENT DOCUMENTS 5,629,518 A 5/1997 Grotheer et al. ............. 250/288

(Continued)

FOREIGN PATENT DOCUMENTS

DE 4441972 A1 8/1996

(Continued)

OTHER PUBLICATIONS

RIMMPA, 10th, 2001, pp. 546-547.

(Continued)

*Primary Examiner*—Jack I Berman
*Assistant Examiner*—Brooke Purinton
(74) *Attorney, Agent, or Firm*—Jacobson Holman PLLC

(57) ABSTRACT

The invention provides an ultra-sonic jet multi-photon resonance ionization type mass analyzing device.

The laser beam ionization mass analyzing device includes a pulsed gas ejecting device 12 for ejecting in pulse mode carrier gas containing sample molecules into a vacuum vessel 17, a laser beam irradiation system for irradiating laser beam for selective photo-reaction of sample molecules in said pulsed gas, repeller and extraction electrodes 18 and 19 generating an electric field for extraction of sample molecular ions generated by the photo reaction and a mass analyzing device 26 for mass analysis of extracted sample molecular ions. The laser beam irradiation system is set to irradiate laser beam to sample molecules near a position whereat a pressure time distribution of pulsed gas translating in the vacuum vessel 17 transitions from a flat-top pressure distribution to a triangular pressure distribution.

19 Claims, 24 Drawing Sheets

U.S. PATENT DOCUMENTS

| | | | | |
|---|---|---|---|---|
| 6,390,115 | B1 * | 5/2002 | Rohwer et al. | 250/288 |
| 6,573,493 | B1 * | 6/2003 | Futami et al. | 250/288 |

FOREIGN PATENT DOCUMENTS

| | | |
|---|---|---|
| JP | 8-222181 | 8/1996 |
| JP | 2001-108657 | 4/2001 |

OTHER PUBLICATIONS

Scoles, Atomic and Molecular Beam Methods, Basic Techniques, Oxford Univ. Press, 1988, pp. 62-68.

Smith, Jr. et al, Trans of the ASME, Dec. 1962, pp. 434-446, A Theoretical Method fo Determining Discharge Coefficients for . . . .

Hayes, Chem. Rev. 87, 1987, pp. 745-760, Analytical Spectroscopy in Supersonic Expansions.

Saenger et al, J. Chem. Phys. 79, Dec. 15, 1983, pp. 6043-6045, On the time required to reach fully developed flow in pulsed . . . .

Suzuki et al, Analytical Sci. 2001, vol. 17 Suppl., pp. i563-I-566, A New Laser Mass Spectrometry for Chemical Ultratrace . . . .

* cited by examiner

【Fig. 1】
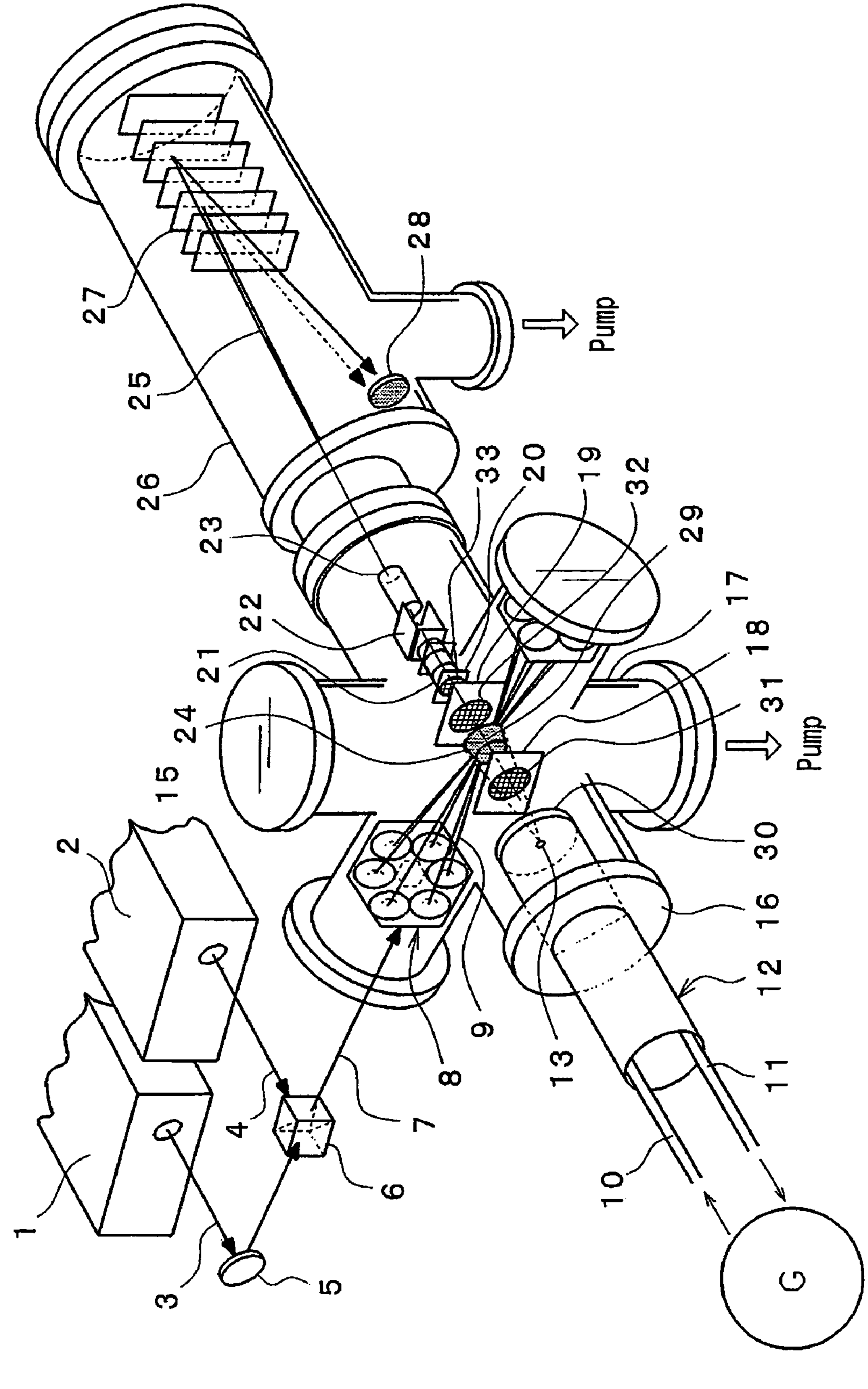

【Fig. 2】
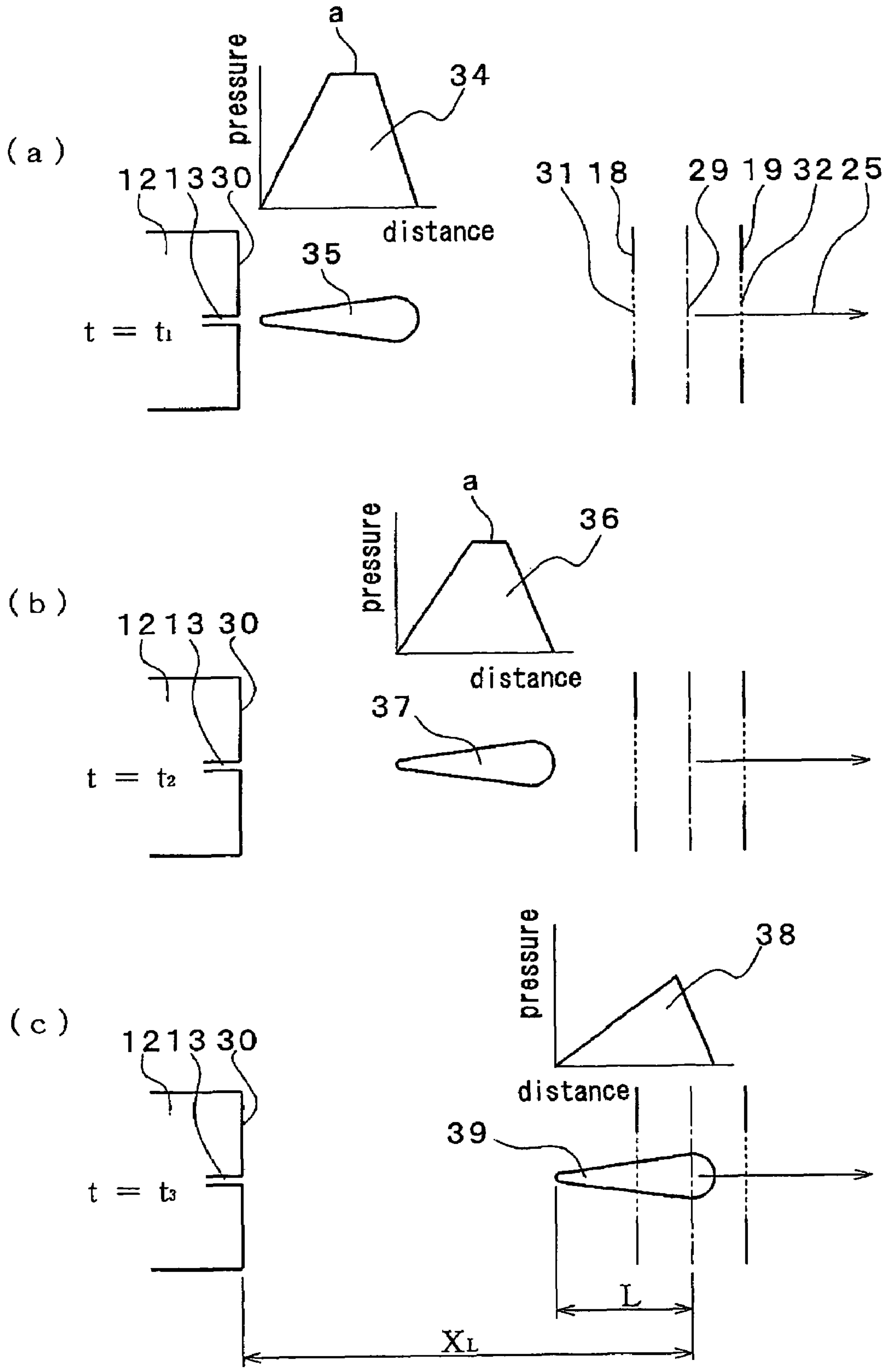

【Fig. 3】
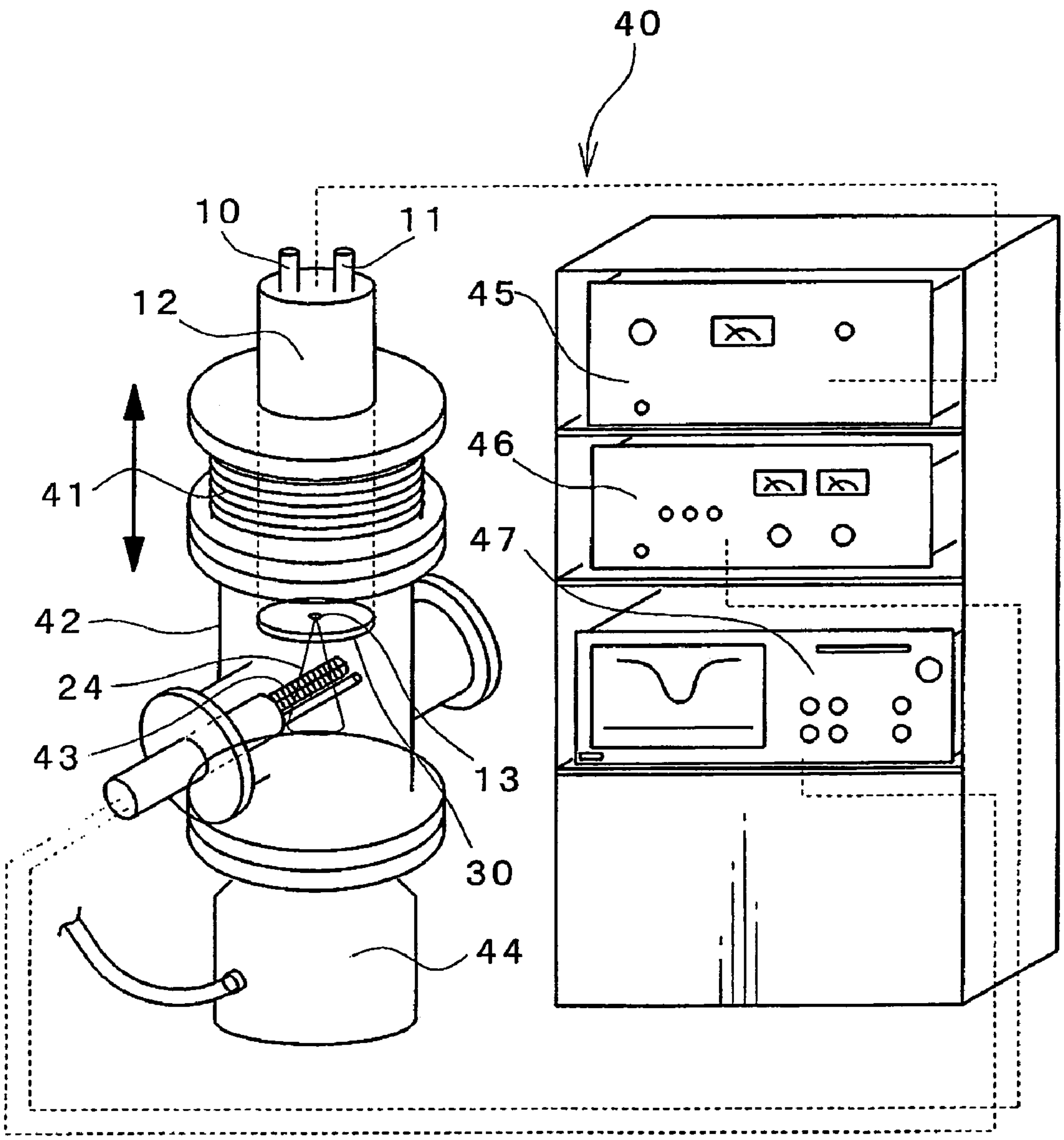

【Fig. 4】
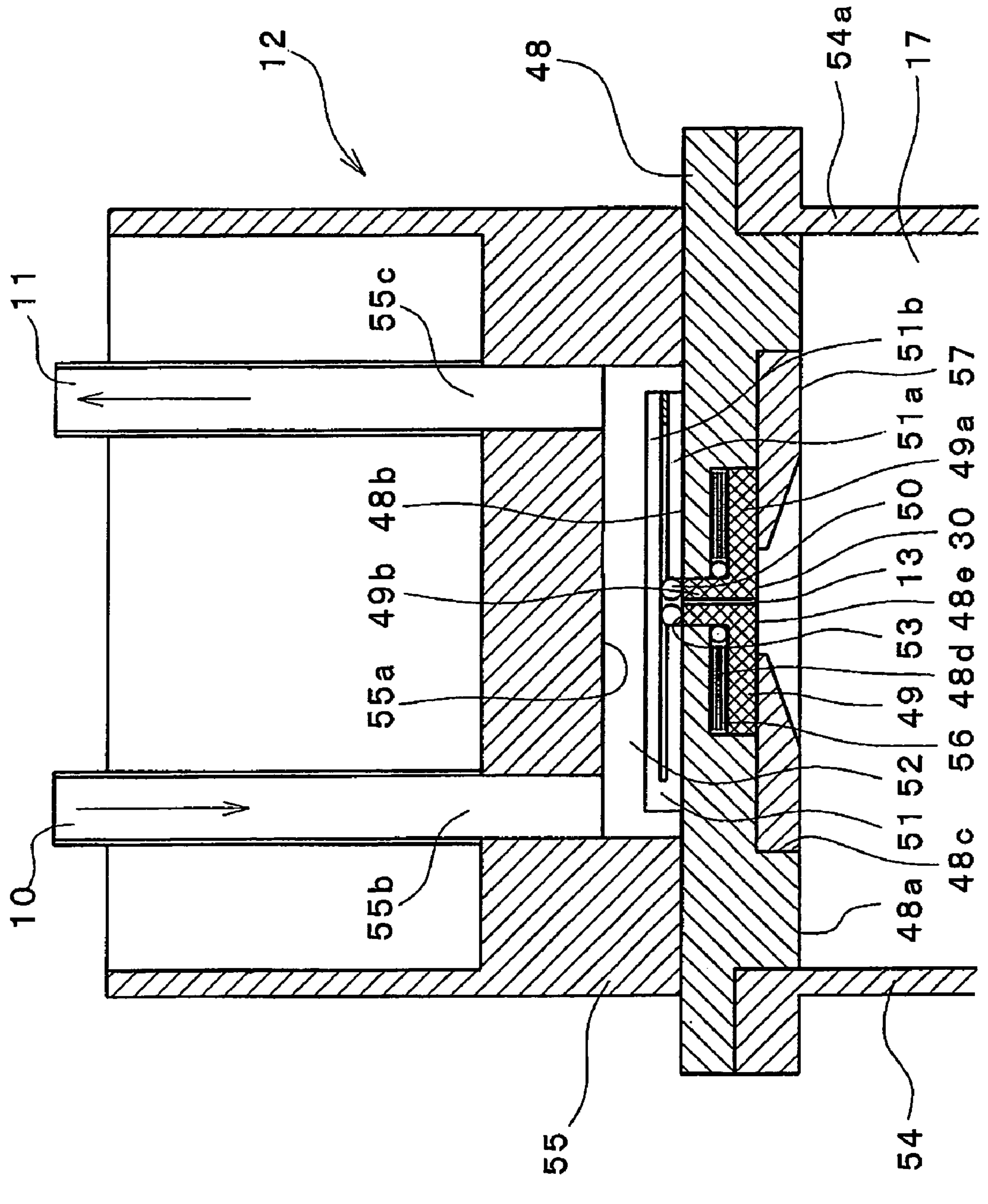

【Fig. 5】
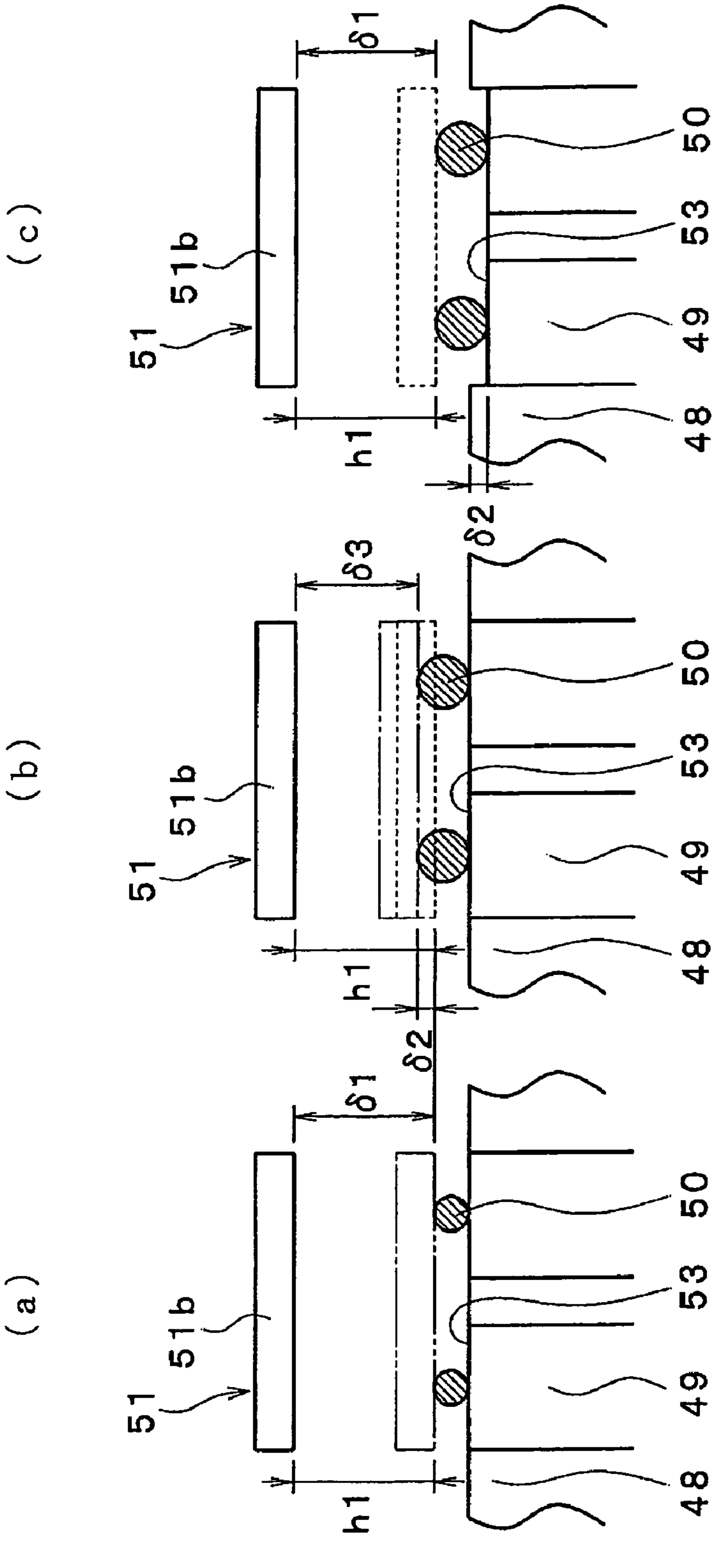

【Fig. 6】
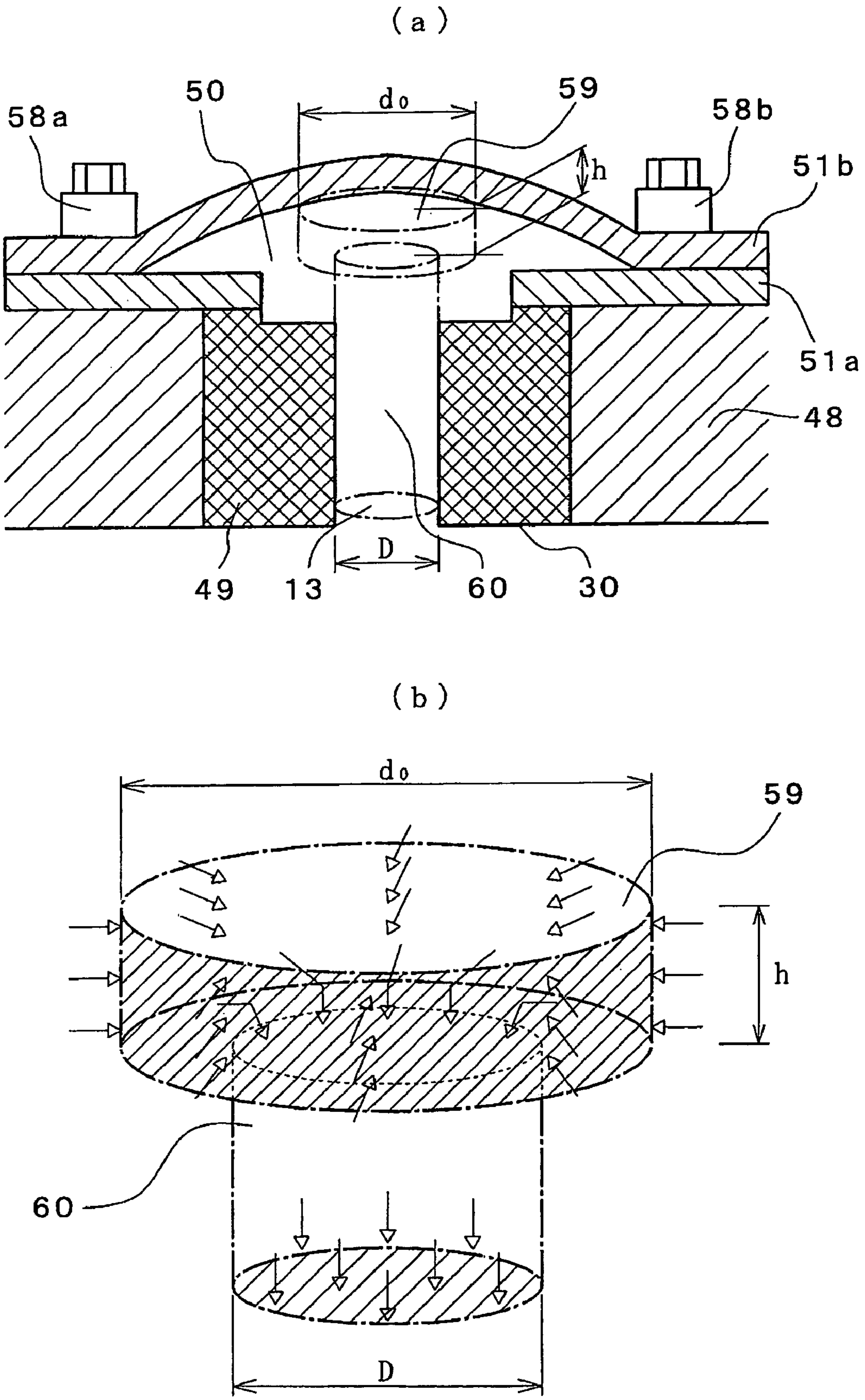

【Fig. 7】
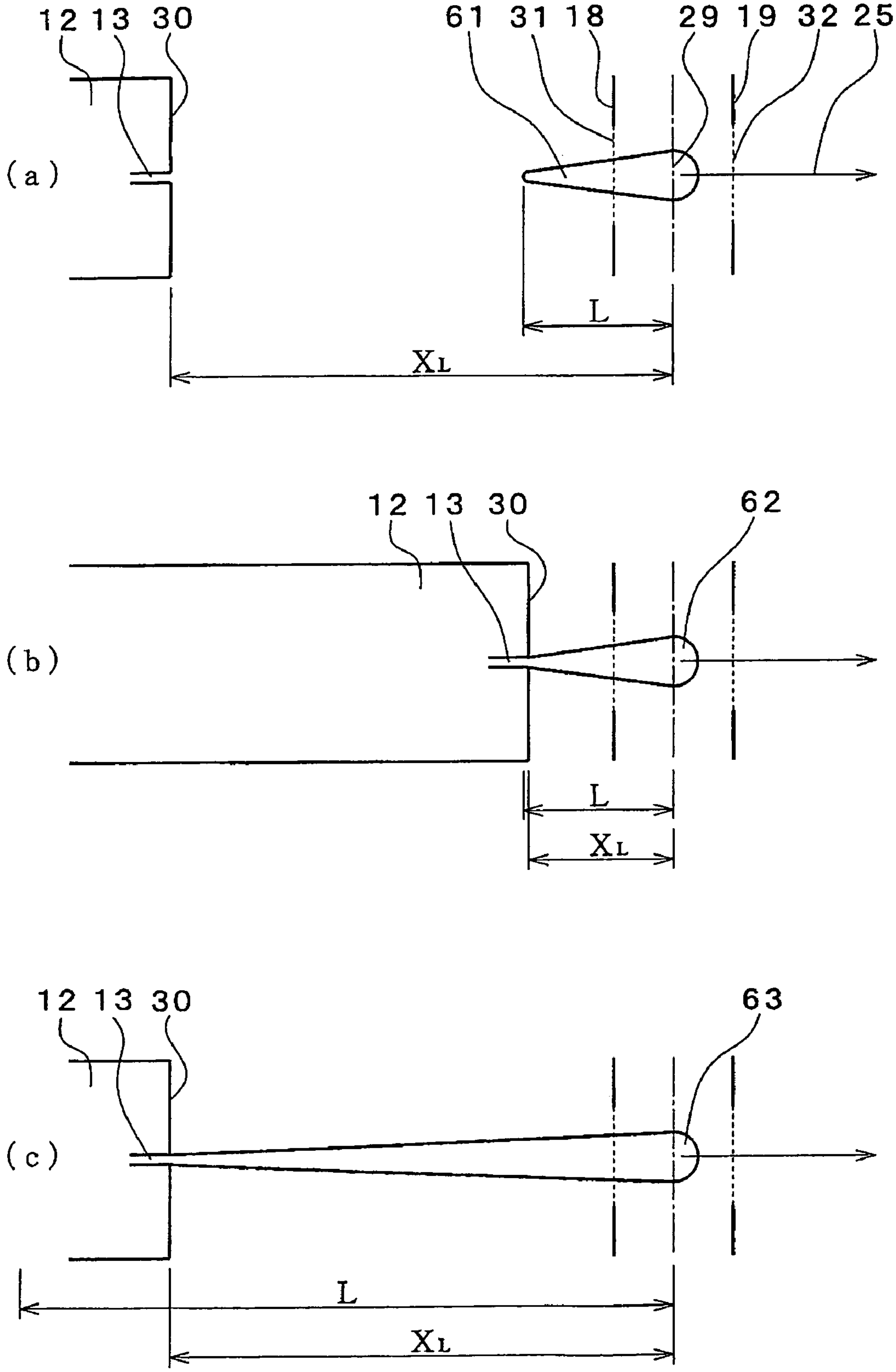

【Fig. 8】
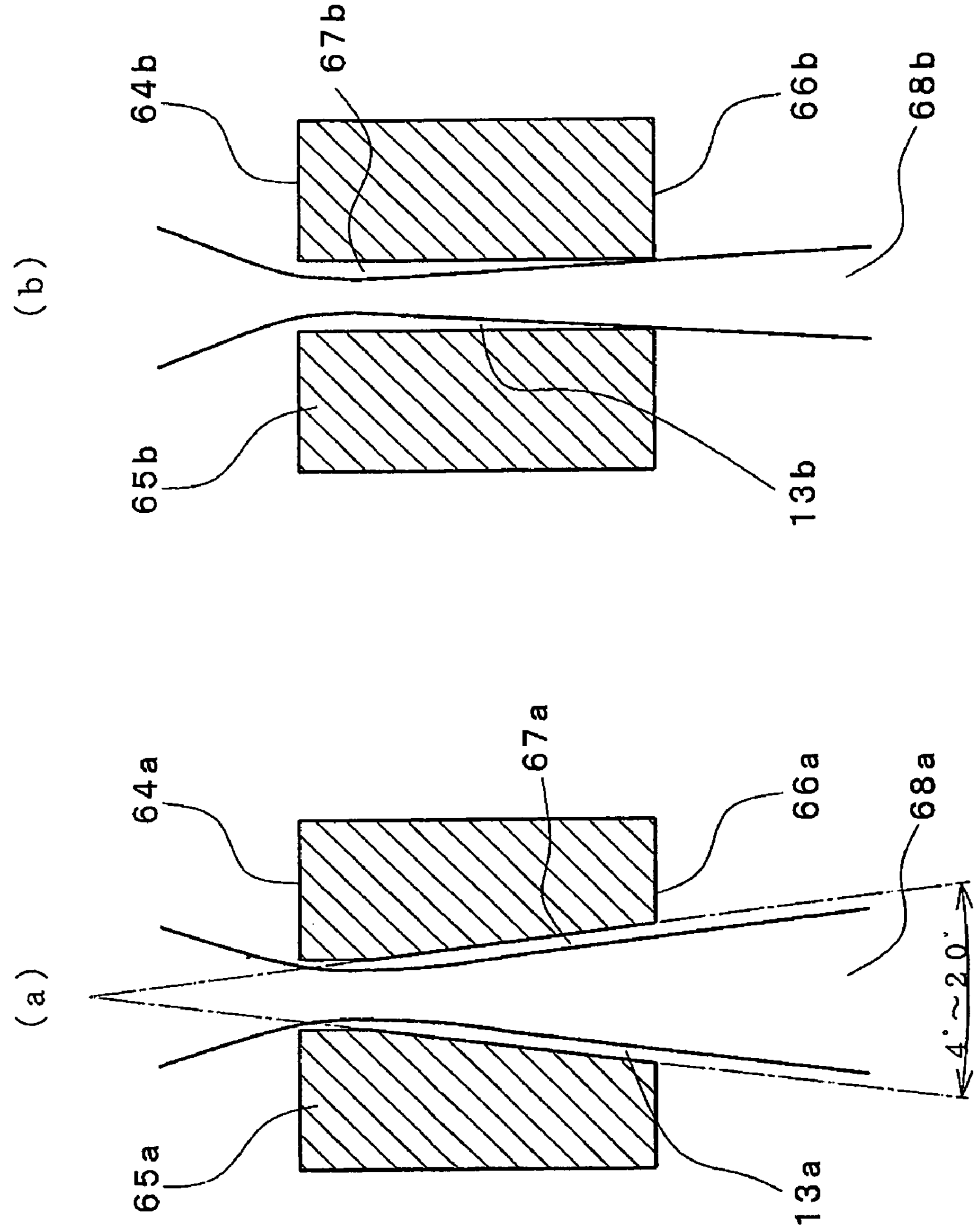

【Fig. 9】
(a)
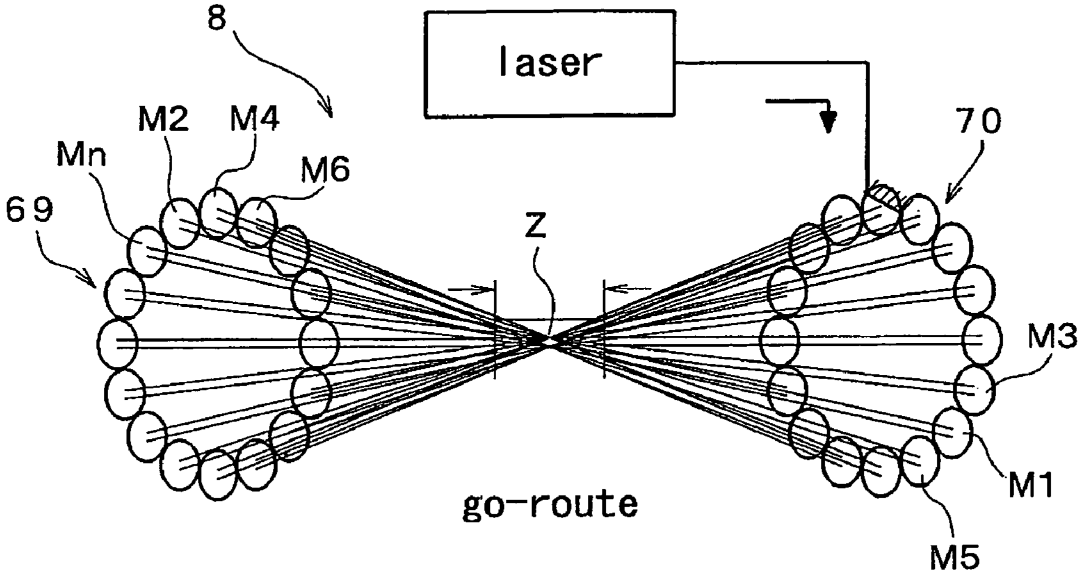
(b)
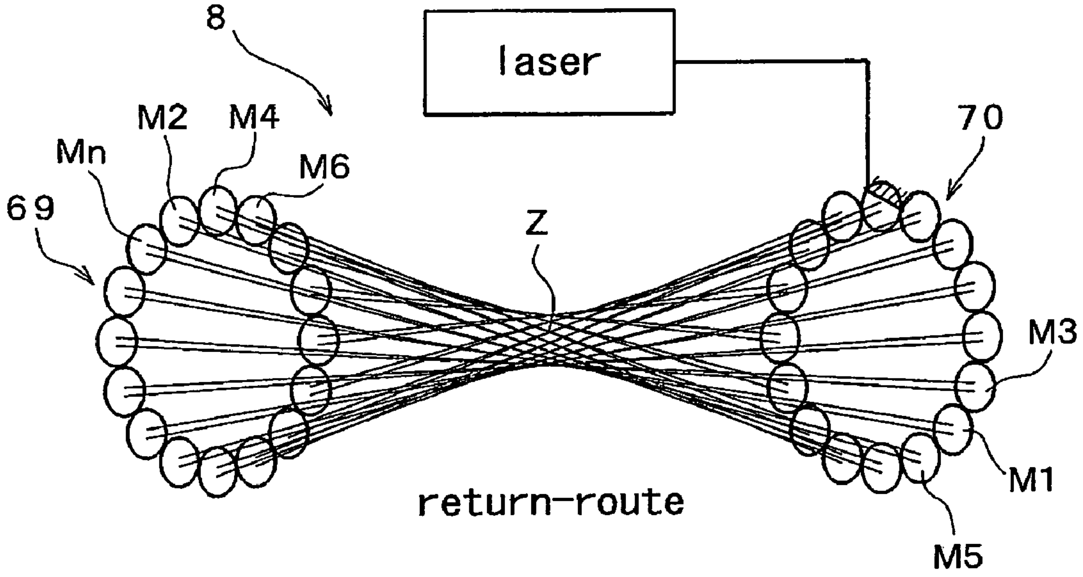

【Fig. 10】
(a)
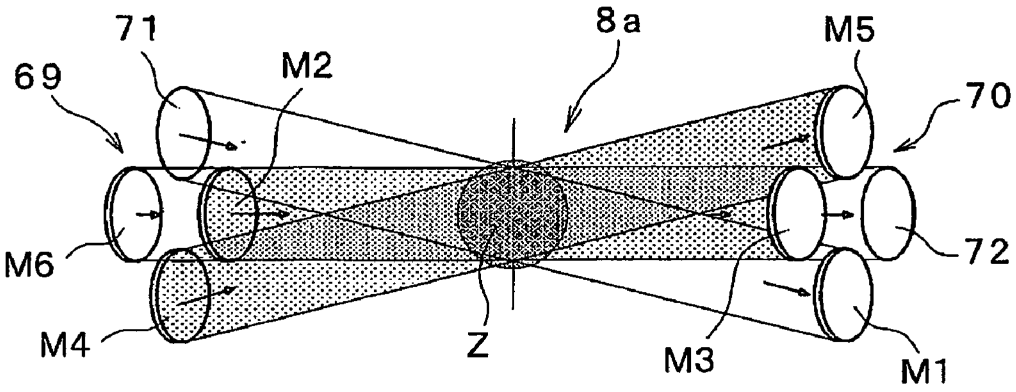
(b)
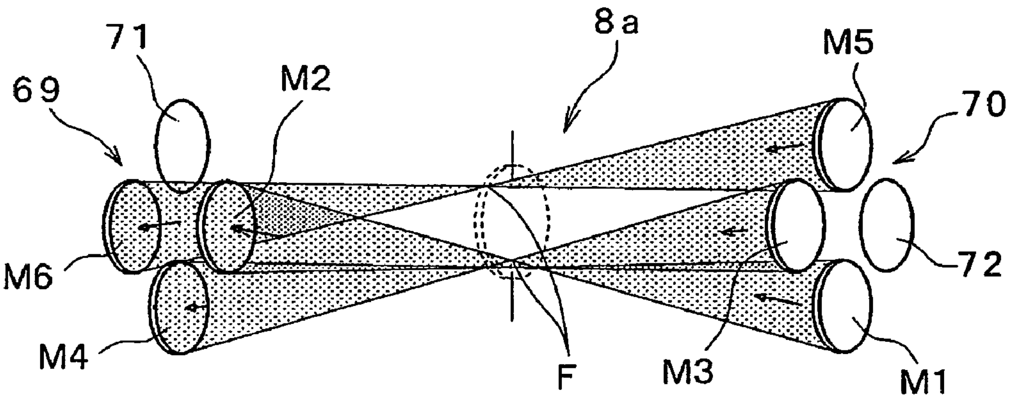
(c)
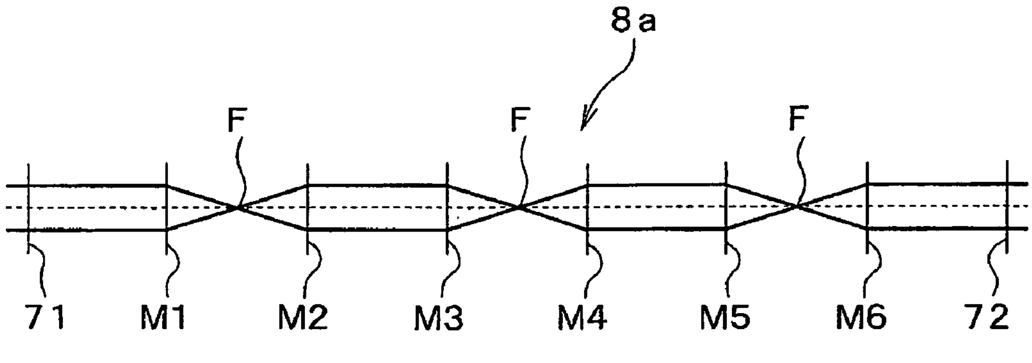

【Fig. 11】
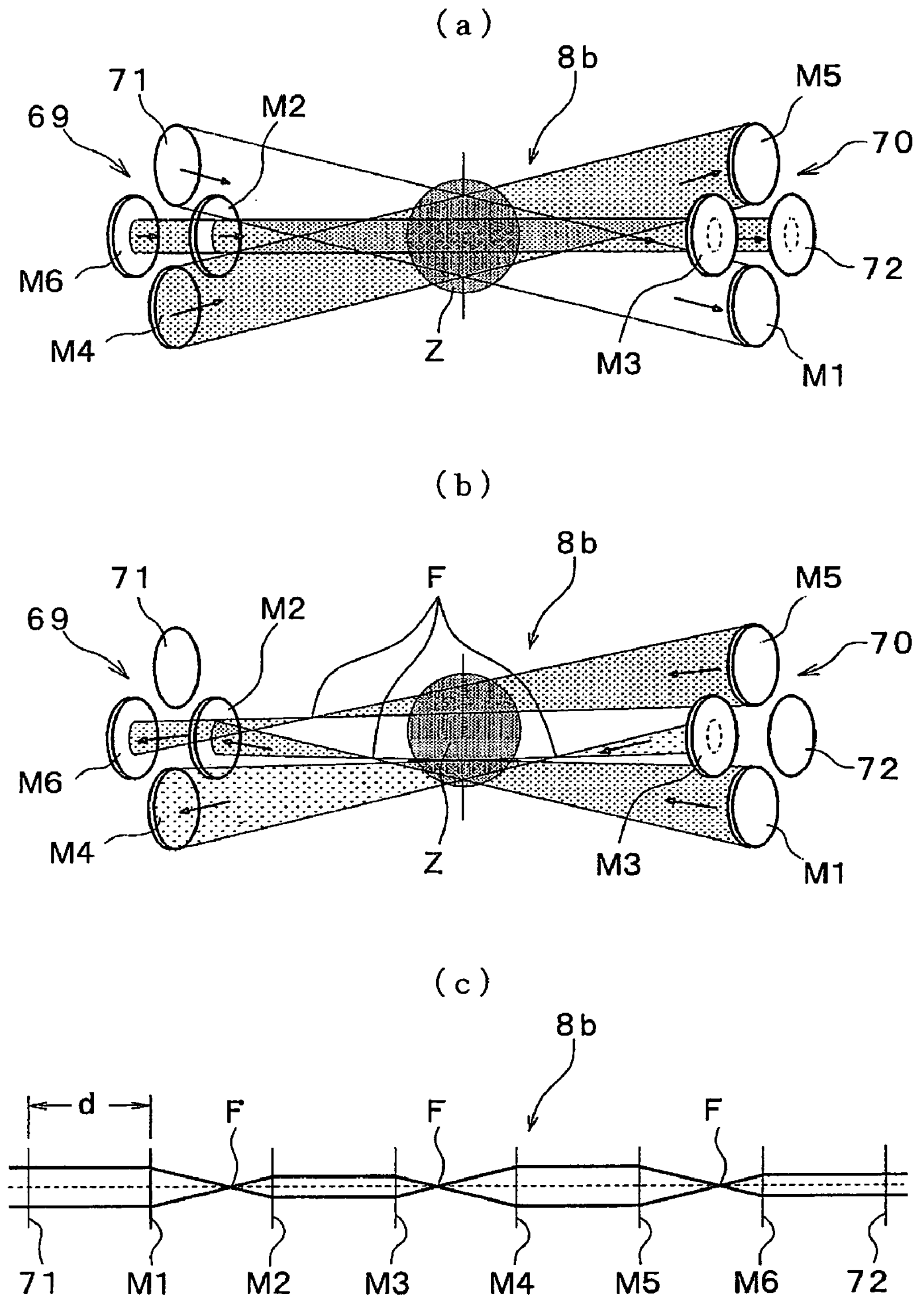

【Fig. 12】
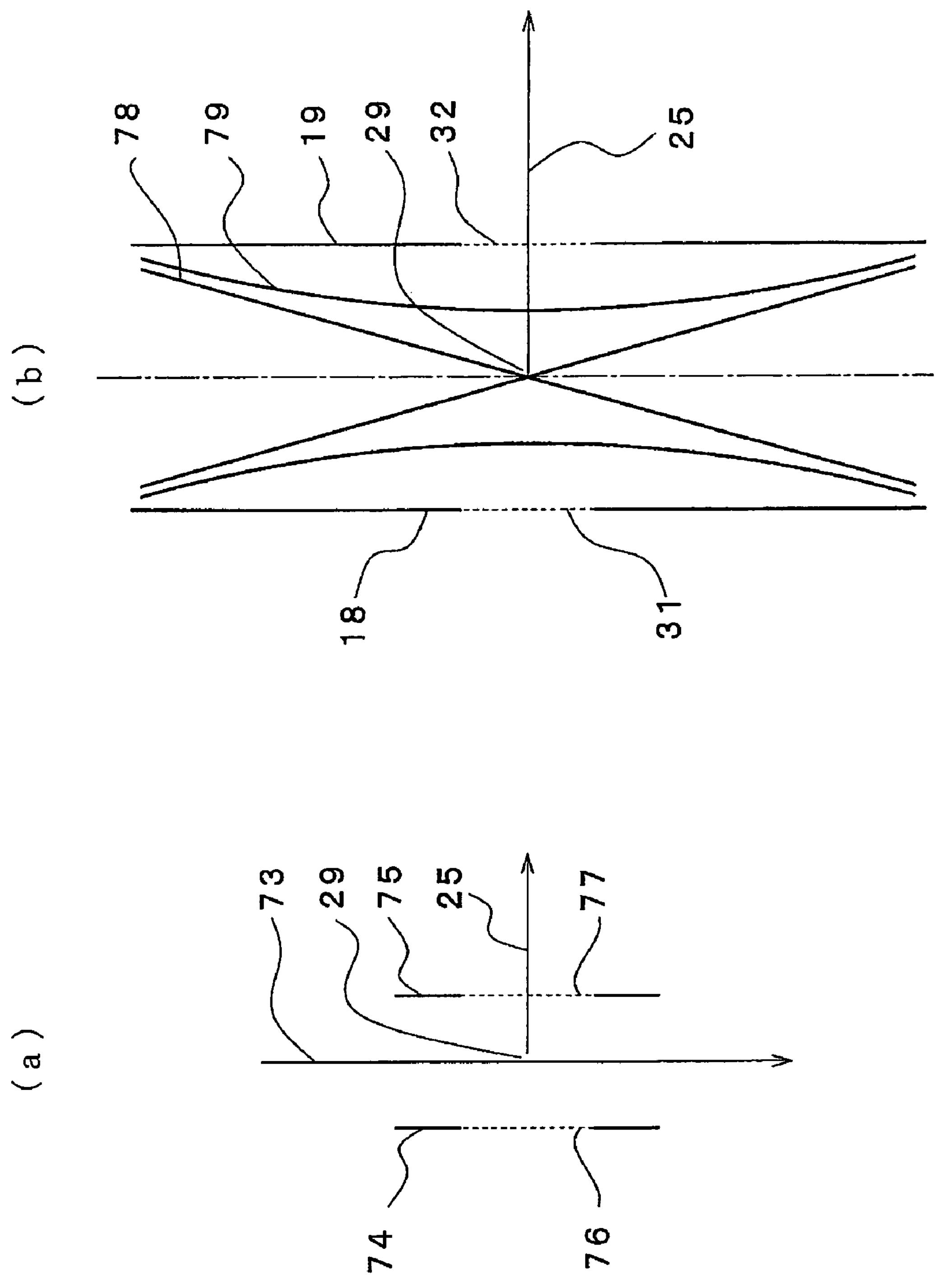

【Fig. 13】
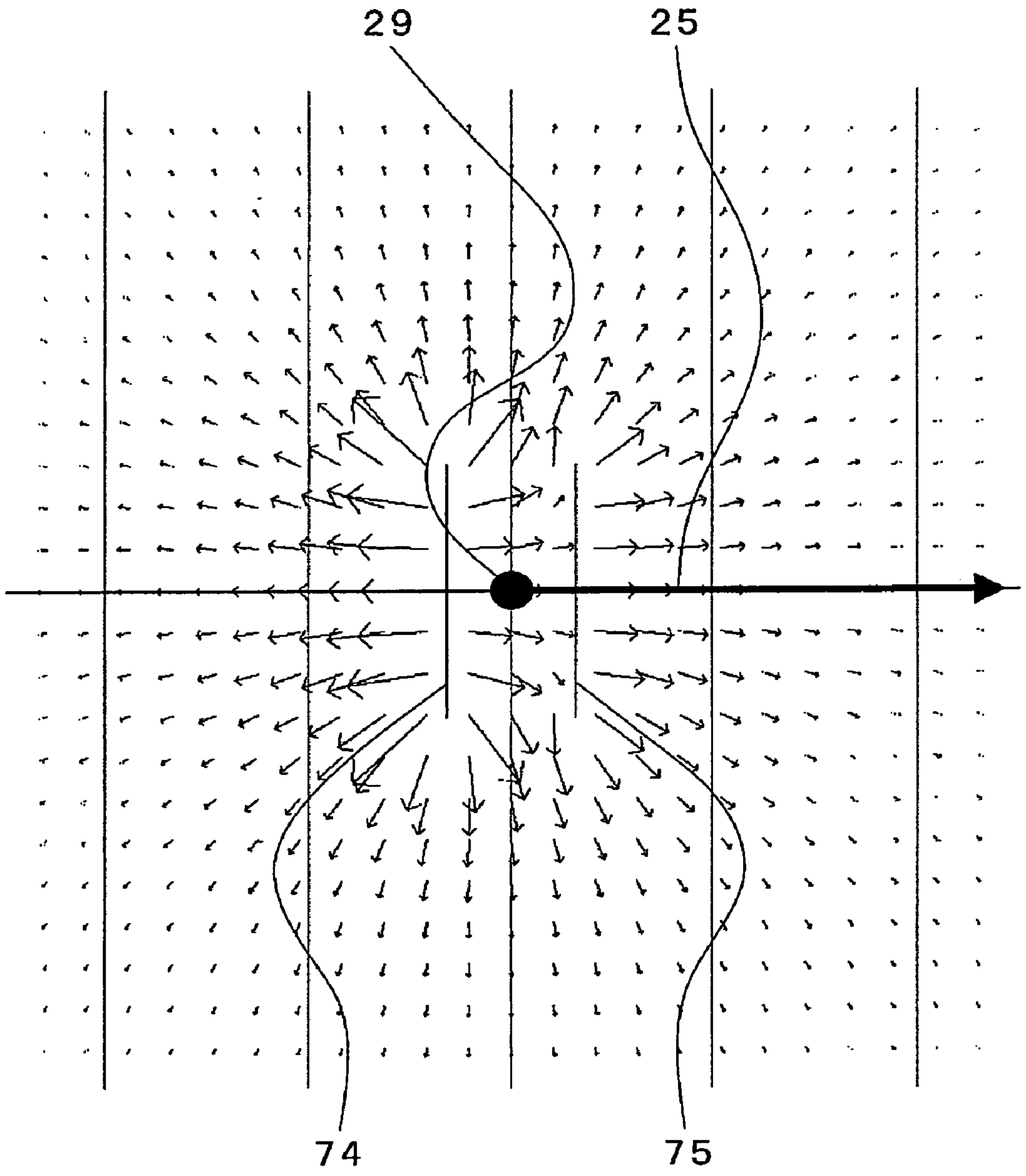

【Fig. 14】
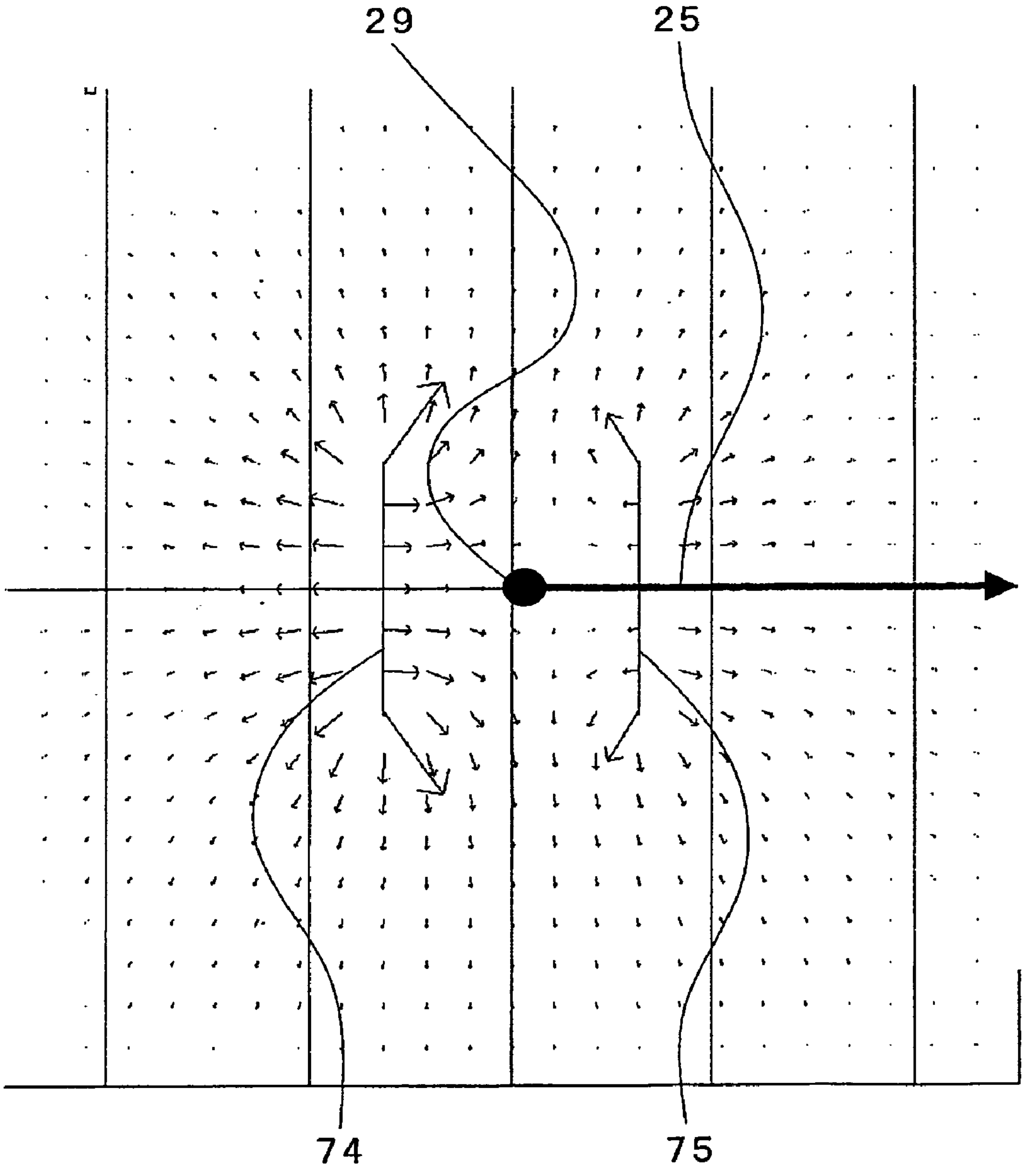

【Fig. 15】
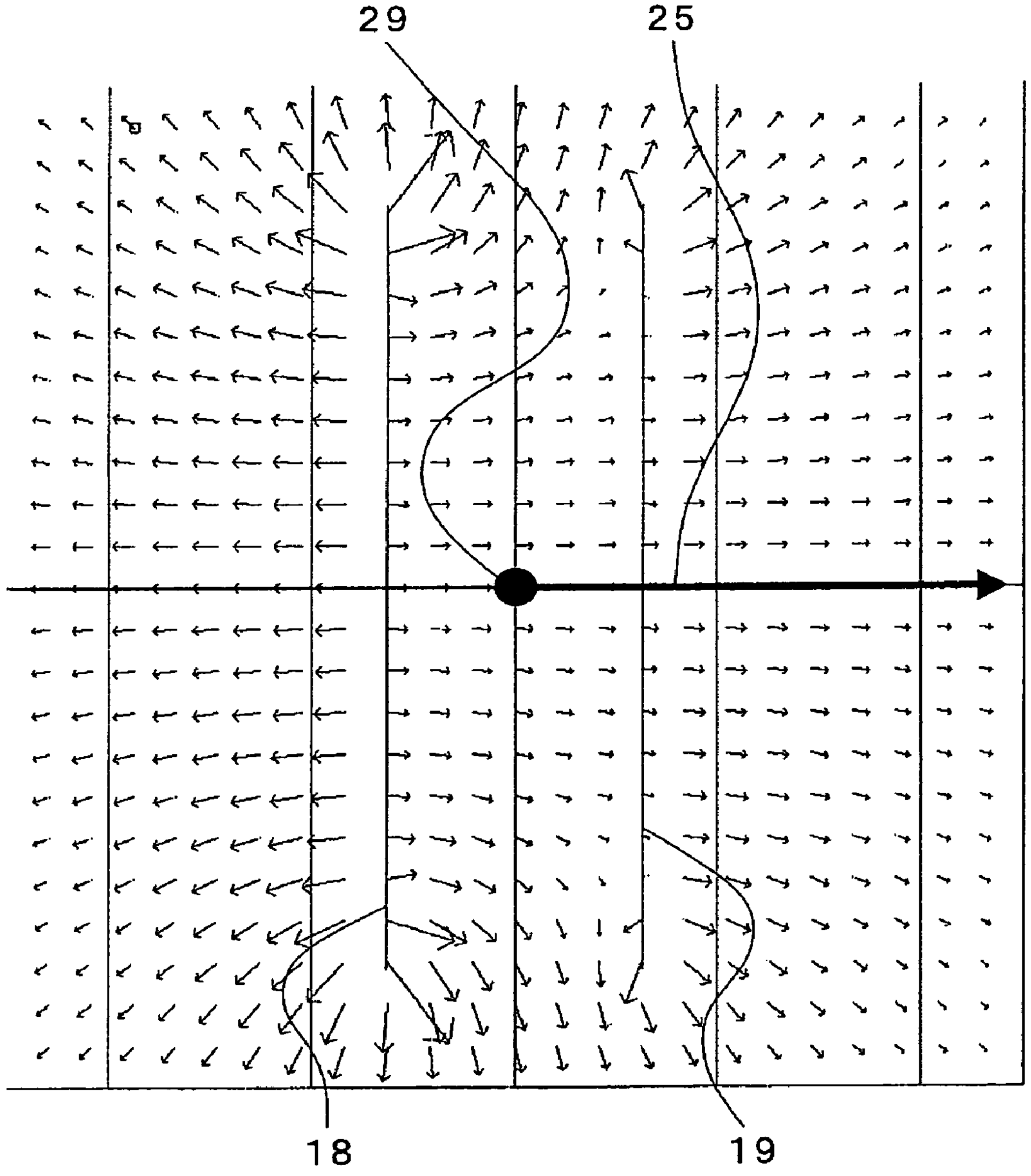

【Fig. 16】
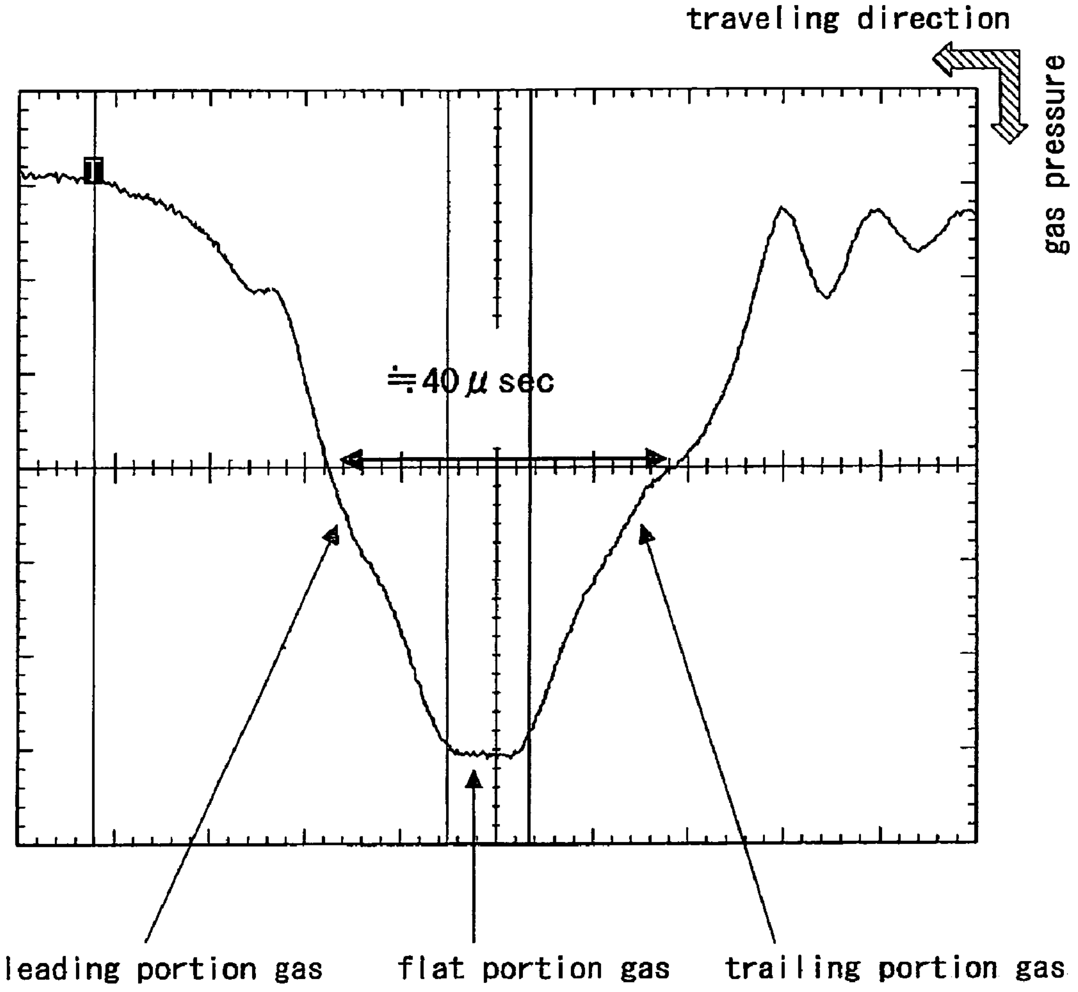

【Fig. 17】
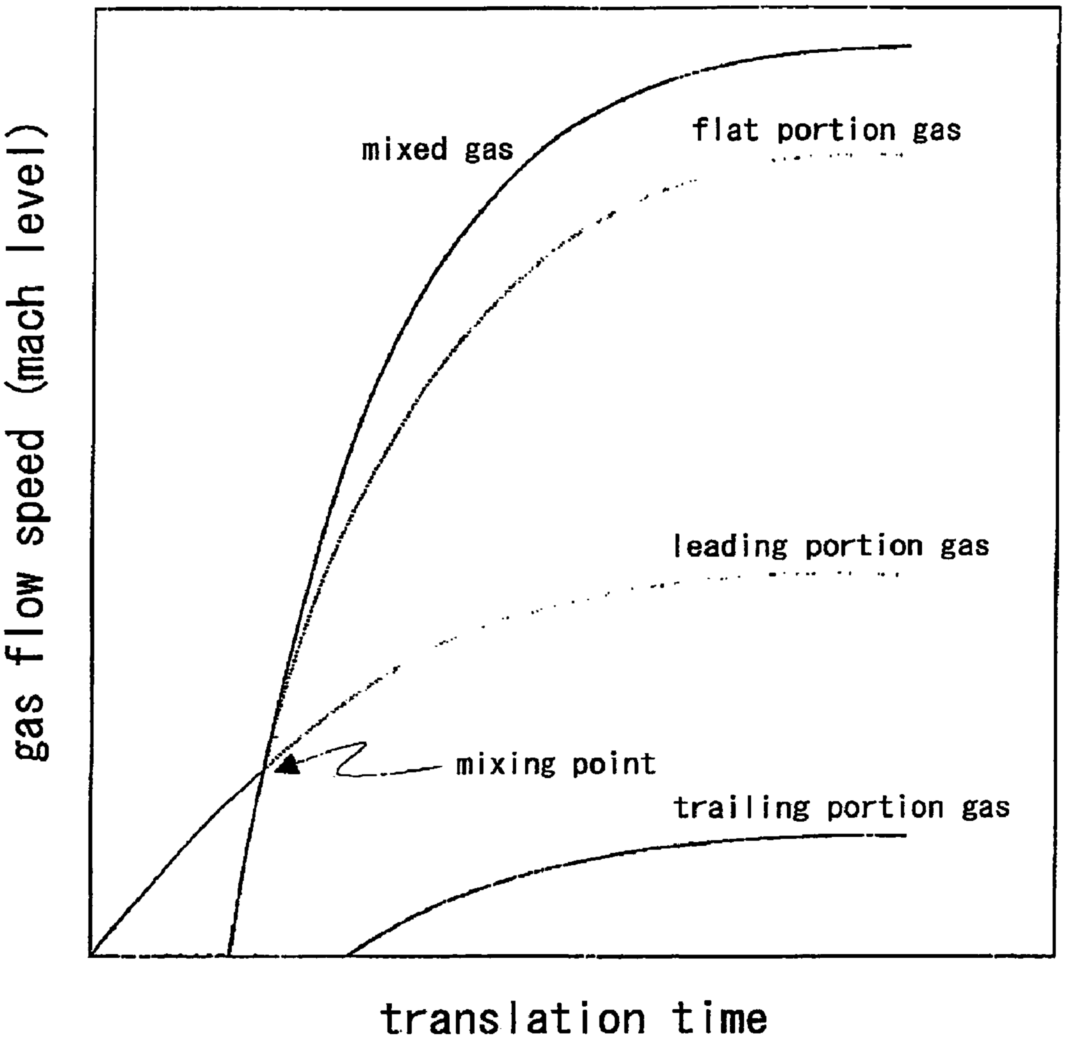

【Fig. 18】
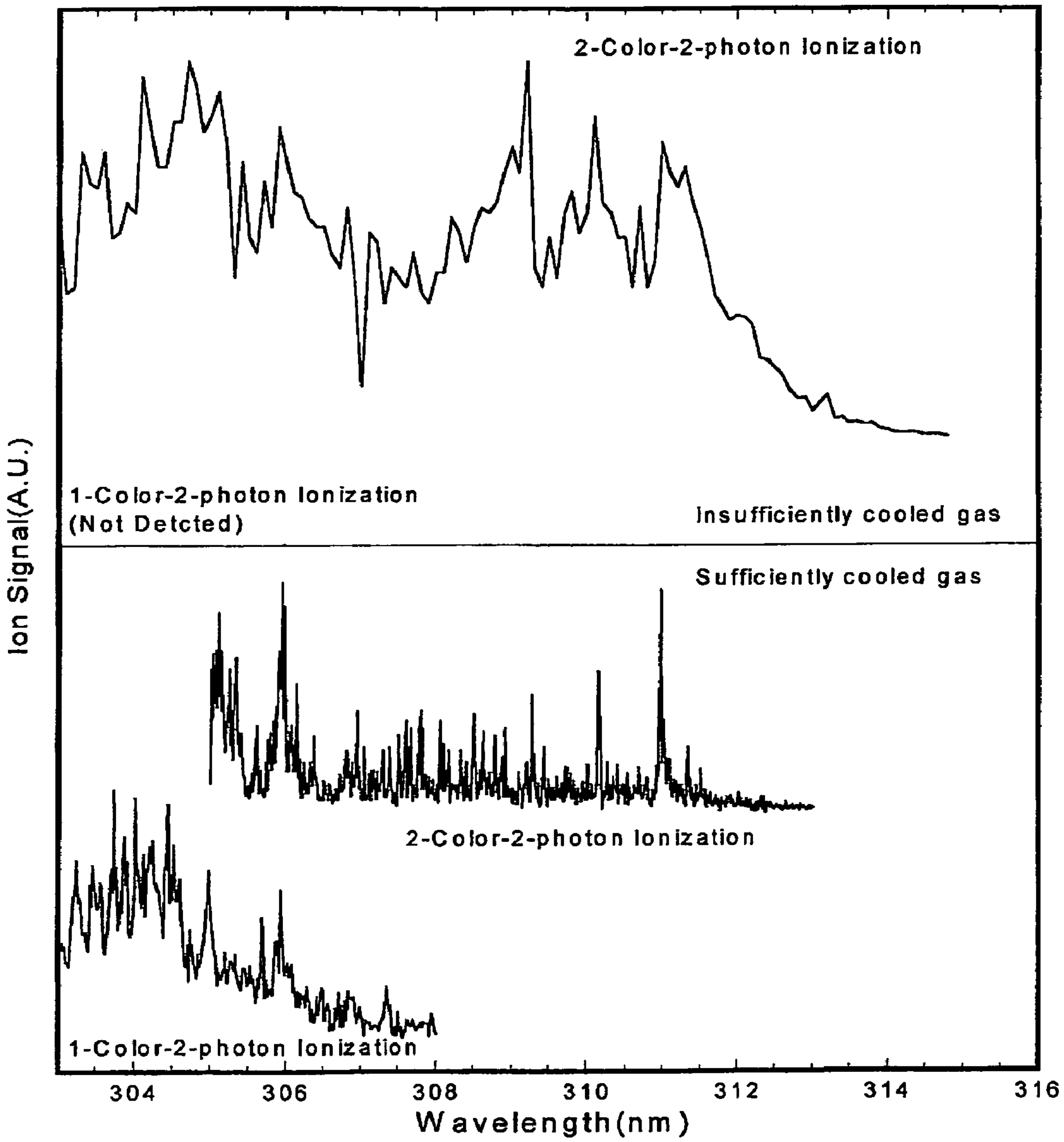

【Fig. 19】
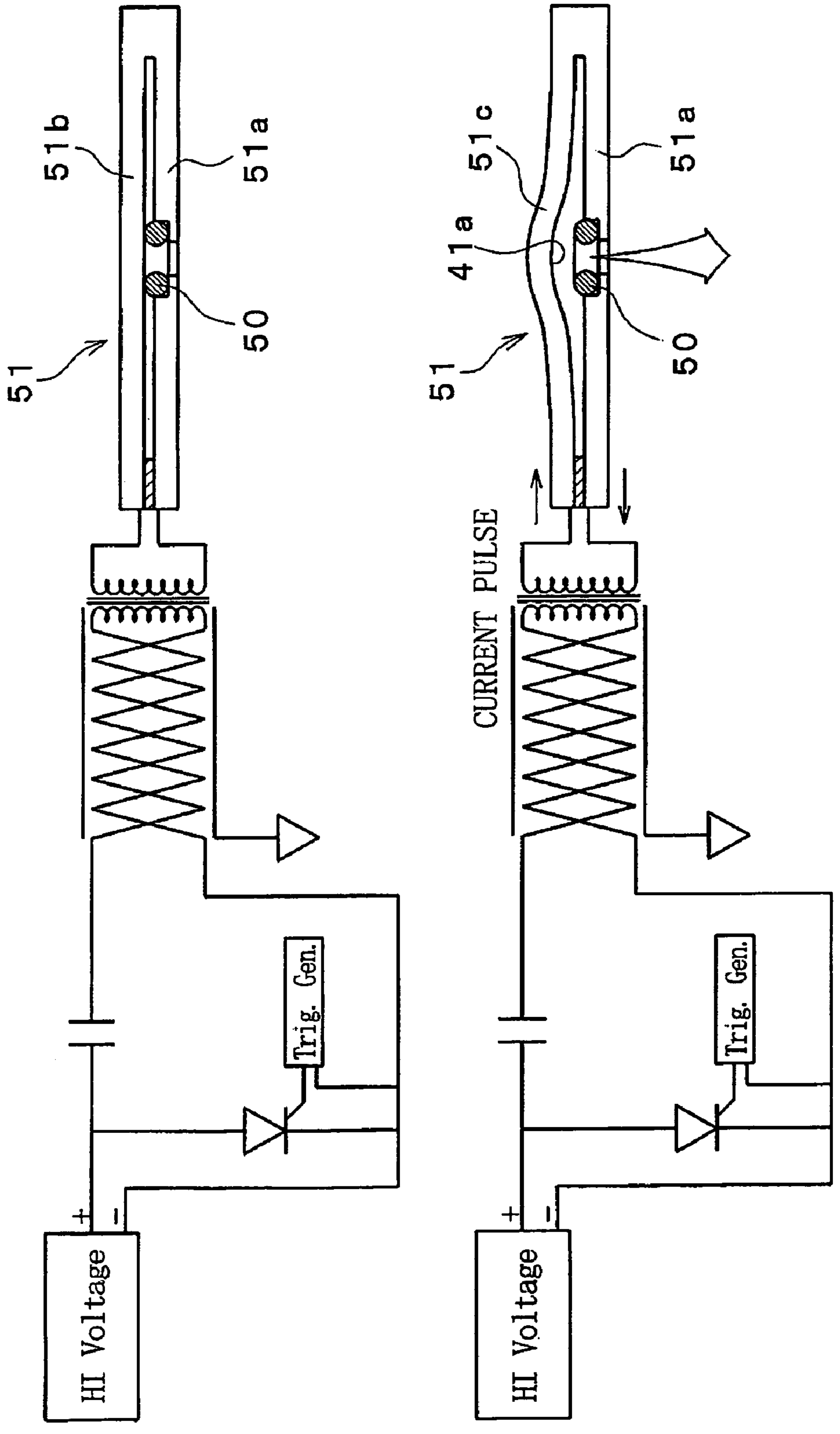

【Fig. 20】
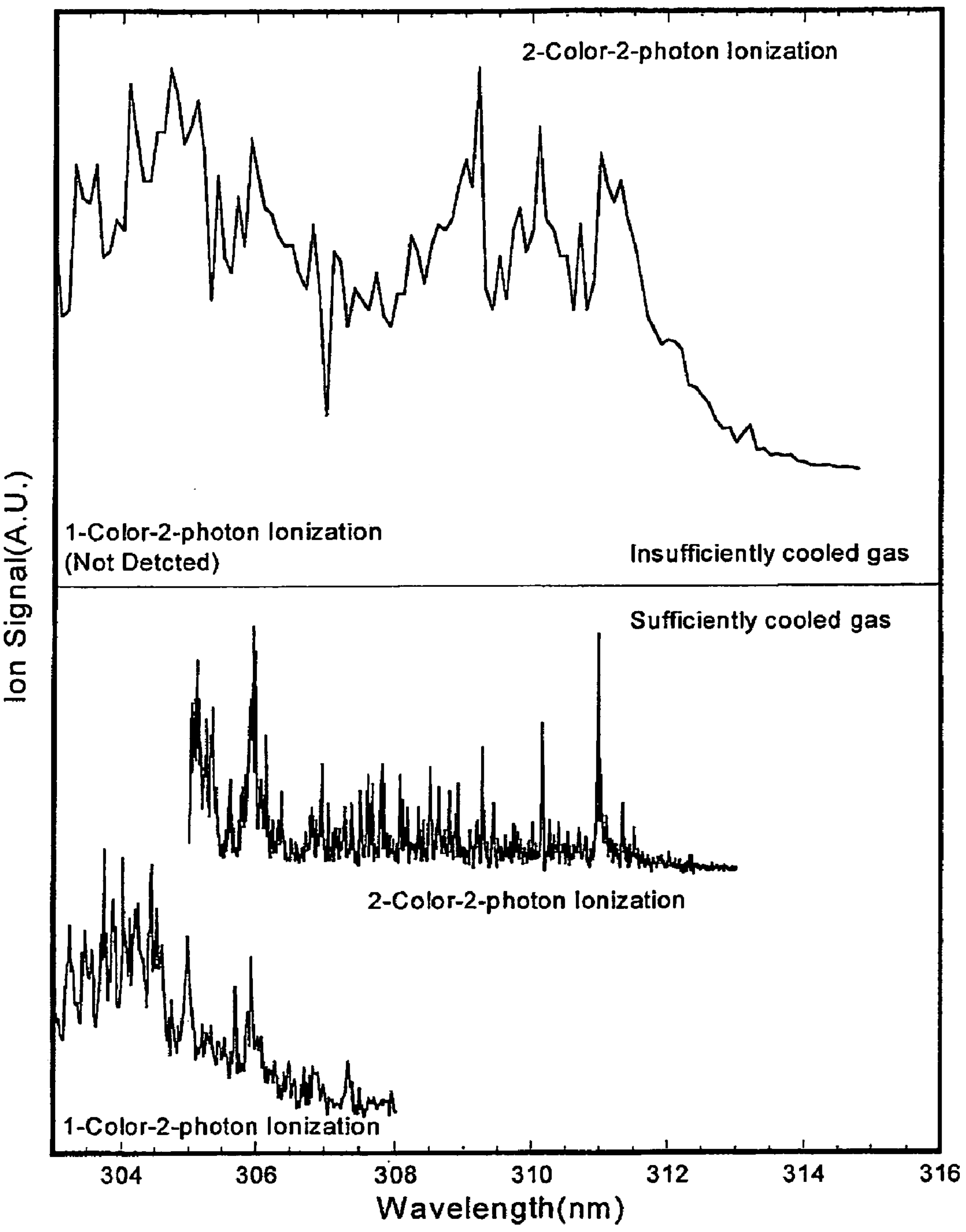

【Fig. 21】
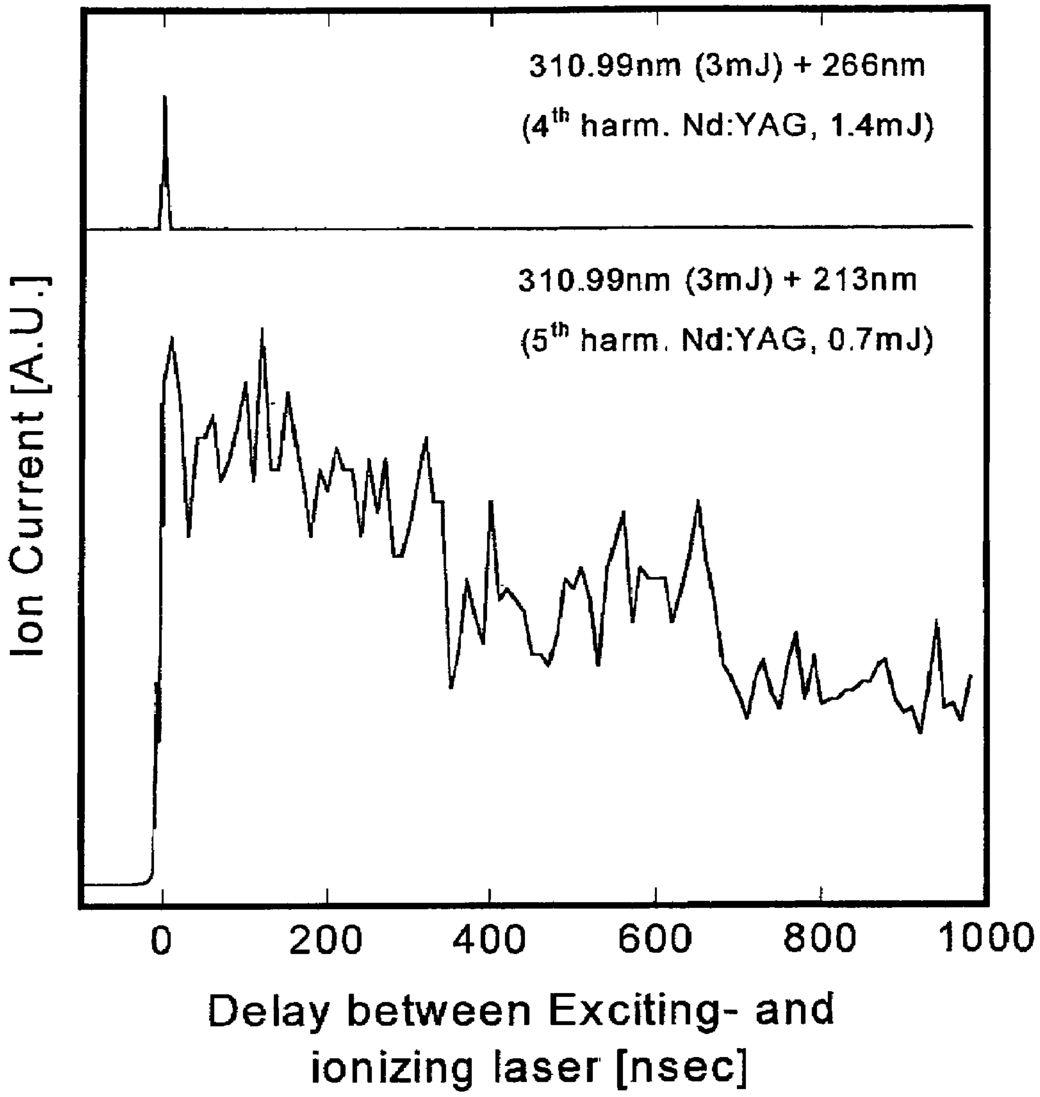

【Fig. 22】
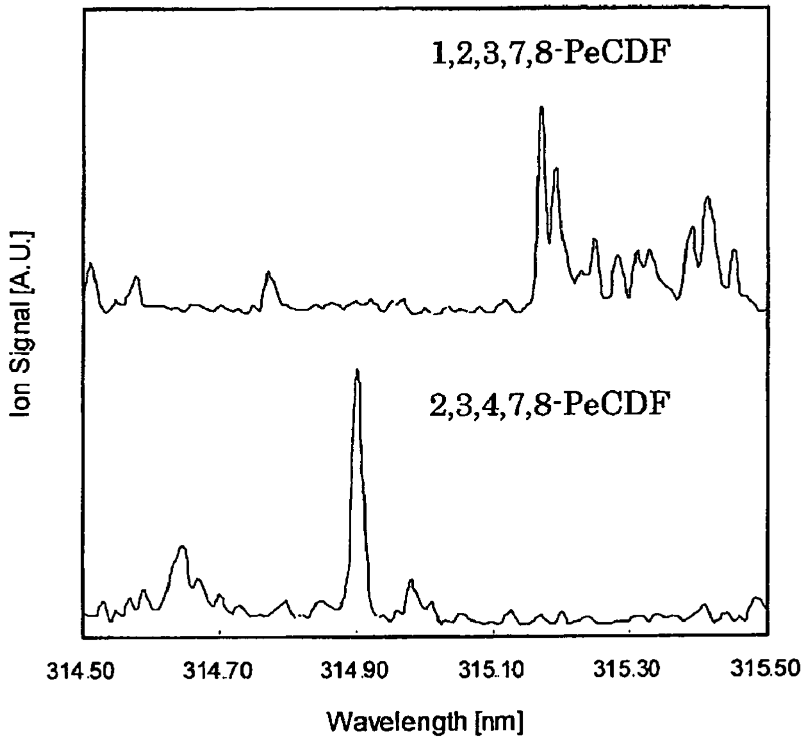
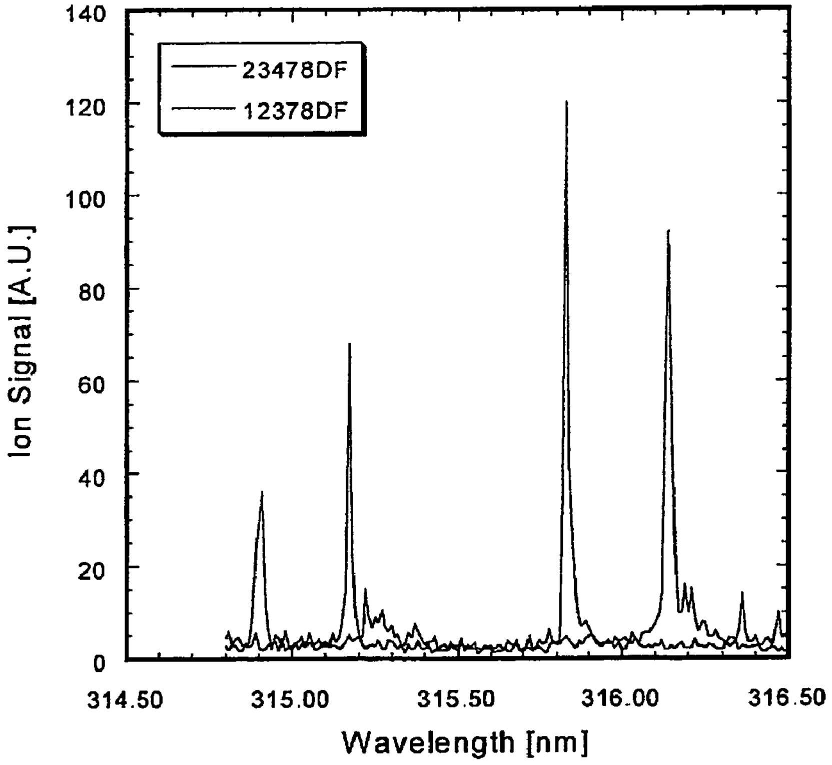

【Fig. 23】
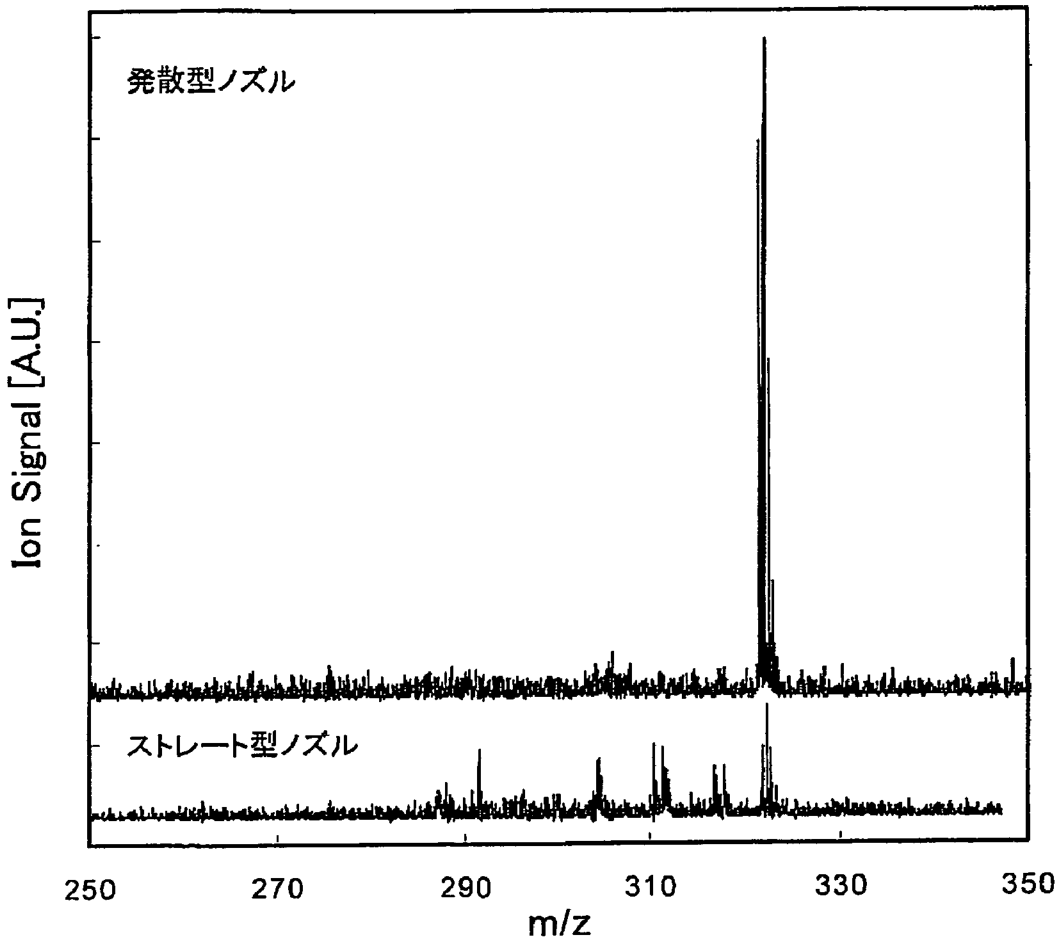

【Fig. 24】
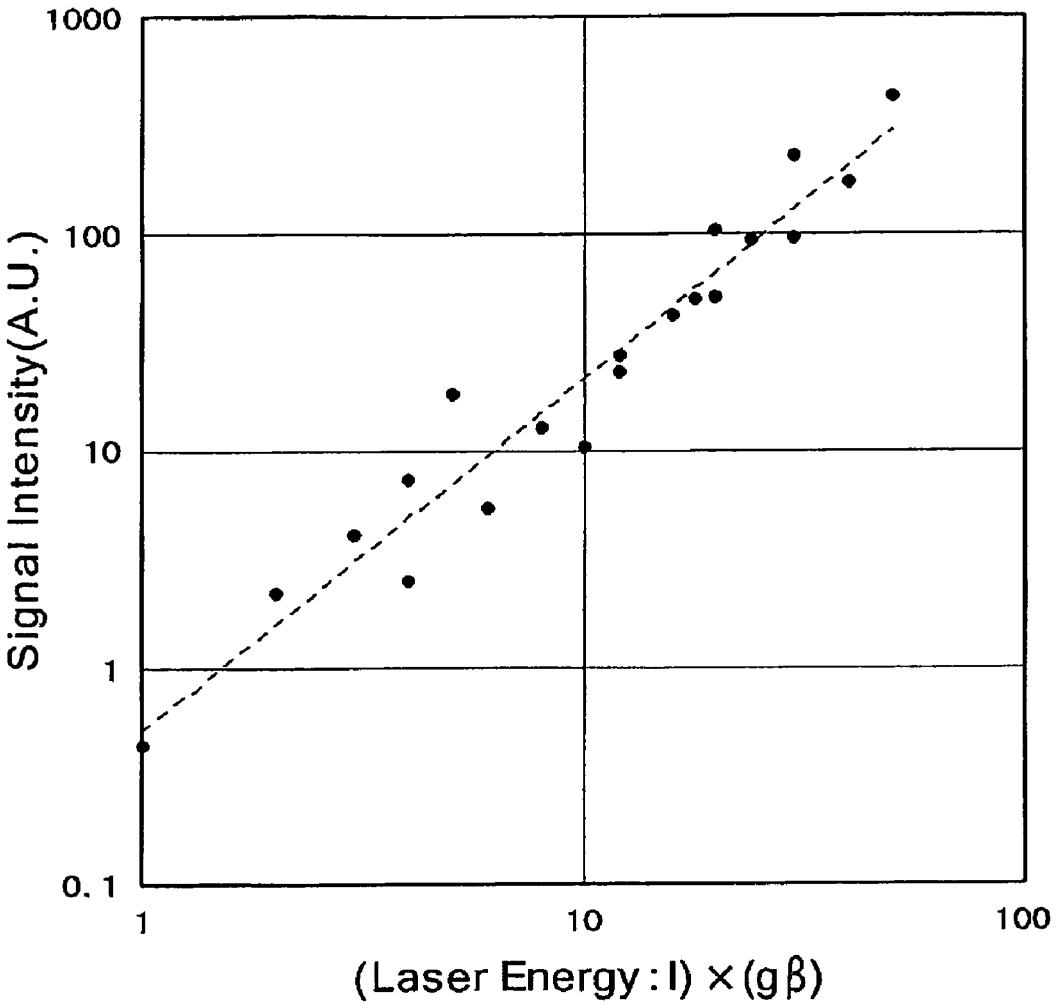

LASER IONIZATION MASS SPECTROSCOPE

This is a nationalization of PCT/JP2005/004521 filed 15 Mar. 2005 and published in Japanese.

TECHNICAL FIELD OF THE INVENTION

The present invention relates to a photo-accumulation type laser ionization mass spectrometer in which carrier gas containing sample molecules such as dioxins is ejected in pulse mode from a nozzle of a ejecting device provided with a high speed short duration pulse valve into a vacuum vessel, carrier gas is irradiated to said carrier gas flow for selective ionization of sample molecules and the ionized sample molecules are detected and analyzed by a mass spectrometer.

BACKGROUND ARTS

For these years, an analyzer based on supersonic jet resonance enhanced multi-photon ionization process (Jet-REMPI method) has been proposed which enables direct and on-line analysis of dioxins. In the process, carrier gas containing sample molecules such as dioxins is ejected in pulse mode from an ejecting device provided with a high speed short duration pulse valve into a vacuum vessel, laser beam is irradiated to the carrier gas flow for selective ionization of the sample molecules and ionized sample molecules are detected for analysis. In identification of sample molecules, mass to charge ratio (m/z) can be used for congeners and resonance wavelength can be used for isomers.

In the case of this system, the biggest technical problem is at what position of a distance from the nozzle of the high speed pulse valve the laser beam should be irradiated with the optimum effect to the carrier gas flow. JPOH 8-222181 discloses a view that the optimum position falls in the region where the carrier gas flow transitions from a continuous flow to a molecular flow. That is, the optimum position for laser beam irradiation, i.e. the ionization zone, is located near an interface between the continuous flow zone formed by expansion in vacuum of carrier gas and the molecular flow zone. From the viewpoint of gaseous molecule kinetics, the distance X of the ionization zone from the nozzle outlet opening is defined as follows;

$$0.5X_T<X<3X_T$$

wherein $X_T$ is a distance from the nozzle to the interface between the continuous flow zone and the molecular flow zone.

In order to perform detection and analysis by Jet-REMPI method of dioxins sample molecules higher than tetrachloride, it is necessary to irradiate laser beam of a pulse width of pico-second and femto-second. This is because dioxin type sample molecules have heavy atom effect by which their excitation lifetime becomes shorter in proportion to the number of chlorine atoms.

Although it has been possible to detect dioxins through irradiation of laser beam of the above-described pulse width to sample molecules, there has been no report of success in their quantification and identification.

Separately from such a process, there is a irradiation process in which sample molecules are irradiated with laser beam of a nano-second pulse width having a photon energy equal to or higher than a energy between ionization potential and excitation triplet state in order to ionize dioxins in a longer lifetime excitation triplet state which transitioned from short excitation lifetime singlet state. Even in the case of this system, however, there has been no report of success in identification and quantification.

The identification of sample isomer molecule by the system disclosed in JPOH 8-222181 is carried out with the resonance carrier gas wavelength intrinsic to the sample molecules. This process is based on a premise that vibration and rotation of sample molecules become discrete spectrum as a result of sufficient cooling of the carrier gas ejected from the high speed pulse valve in the ionization zone.

It is reported in Chem. Rev., 87, (1987) 745-760 by John M. Hayes that generation of characteristics equivalent to a non-pulsed constant irradiation within a prescribed period is indispensable for sufficient cooling of the carrier gas flow ejected from the high speed pulse valve. It is additionally reported that formation of the flat-top portion in the pressure-time distribution is also indispensable when the flow formed into the pressure-time distribution of pulsed gas is observed by fast ionization vacuum gauge.

Minimum retention period of the formed flat top portion is also predicated in the above-described report for various kinds of the carrier gas. When the prescribed period is longer than the minimum retention period, sufficiently cooled gas flow can be obtained.

No substantial means for formation of the flat top portion with sufficient retention period, i.e. the construction of the high speed pulse valve and process of travel of the gas flow ejected from the nozzle through vacuum are, however, reported in either said report nor J. Chem. Phys., 79(12), (1983) 6043-6045 by Katherine L. Saenger and John B. Fenn.

Dioxins are low in vapor pressure. In addition to dioxins, there are lots of gases of low vapor pressure such as organic compounds and their derivatives. These substances are in many cases hygroscopic. When these substances are used for the high speed pulse valve, there is a problem of adsorption to metallic walls. In order to prohibit such adsorption, it is indispensable to use the high speed pulse vale after heating to a high temperature. The heating temperature needs to be 200° C. or higher.

Atomic and Molecular Beam Methods, Oxford University Press, (1988) by Giacinto Scoles discloses high speed pulse valves able to generate pulse supersonic molecular beam. Only two real devices, i.e. “Series 9” by General Valve Corp. and “PSV” by R.M. Jordan Corp. are sold on market. The highest heating temperature is 150° C. for the former and 85° C. for the latter. It is not allowed to raise the temperature higher since the result does not suffice the flow condition of the gas ejected from the nozzle.

It is a choke flow condition of the carrier gas ejected into vacuum via the pulse valve (see the above-described earlier reports). According to the choke condition, a gas flow ejected through the nozzle into vacuum saturates at the maximum flow rate, thereby cooling the ejected carrier gas to an ultra-cold level. This condition is not sufficed since the vacuum sealing element of the pulse valve undergoes thermal expansion, the lift of the valve body of the electromagnetic valve is constant, no sufficient gap can be left between the sealing element and the valve body and, as a consequence, the amount of carrier gas flowing into the nozzle decreases.

SUMMARY OF THE INVENTION

The object of the present invention is to provide an analyzer via supersonic jet resonance enhanced multi-photon ionization which enables efficient identification and quantification of extremely small amount of substances contained in a carrier gas.

Means for Solving the Technical Problems

The laser ionization mass spectrometer in accordance with the basic concept of the present invention comprises pulsed gas ejecting means for ejecting carrier gas containing sample molecules into a vacuum chamber in a pulse mode, a laser beam irradiation system for irradiating laser beam for selective photo-reaction of sample molecules contained in the carrier gas ejected into the vacuum chamber, repeller and extraction electrodes for formation of an electric field adapted for extraction of sample molecule ions generated by the photo-reaction, and mass-to-charge ratio analyzing means such as a reflection type time-of-flight mass spectrometer for mass-to-charge ratio analyzing sample molecule ions extracted by the two electrodes.

The position of the laser beam irradiation system is set such that laser beam is irradiated to the sample molecule near a position whereat the pressure-time waveform of the carrier gas ejected from the pulsed gas ejecting means and translating in the vacuum chamber transitions from a flat-top trapezoidal pressure distribution with a flat portion to a triangular pressure distribution without the flat portion. The laser beam irradiation point X to the carrier gas flow should preferably be set in a range of $0.5X_{L\<X\<}1.5X_L$ wherein $X_L$ is a distance of the above-described transition point of the carrier gas pressure-time waveform from the gas ejection mouth of the pulsed gas ejecting means.

Further, the laser ionization mass spectrometer should preferably provided with laser beam irradiation positioning means for finding the above-described transition point of the pulsed gas pressure-time waveform. The laser beam irradiation positioning means is provided with a high speed ionization vacuum gauge and an oscilloscope. The ionization vacuum gauge is removably arranged at a cross point of the carrier gas flow ejected from the pulsed gas ejecting means into the vacuum vessel with the laser beam irradiated from the laser beam irradiation system whereas the oscilloscope displays the pressure-time waveform of the carrier gas flow detected by the high speed ionization vacuum gauge. The pulsed gas ejecting means is able to change its distance from the high speed ionization vacuum gauge arranged in the vacuum vessel. The optimum laser beam irradiation point is determined through observation by the oscilloscope of a change in the pressure-time waveform of the carrier gas flow induced by change in position of the pulsed gas ejecting means.

Determination of the laser beam irradiation point includes the following steps. The step of arranging the pulsed gas ejecting means at the initial position within the vacuum vessel. The step of arranging the high speed ionization vacuum gauge at the cross point of the carrier gas flow ejected from the pulsed gas ejecting means into the vacuum vessel with the laser beam irradiated from the laser beam irradiation system. The step of ejecting in pulse mode the carrier gas flow from the pulsed gas ejecting means to the high speed ionization vacuum gauge. The step of detecting the pressure of the carrier gas flow by the high speed ionization vacuum gauge. The step of observing the pressure-time waveform of the carrier gas by the oscilloscope. The step of confirming presence of the flat portion in the waveform. The step of moving stepwise the pulsed gas ejecting means from the initial position in a direction distant from the high speed ionization vacuum gauge. The step of ejecting in pulse mode the carrier gas flow from the pulsed gas ejecting means to the high speed ionization vacuum gauge. The step of detecting the pressure of the carrier gas flow by the high speed ionization vacuum gauge. The step of observing the pressure-time waveform of the carrier gas by the oscilloscope. The step of confirming absence of the flat portion in the carrier gas flow pressure-time waveform at a position observed by the oscilloscope. The step of determining the laser beam irradiation point to the carrier gas flow near the relative position of the pulsed gas ejecting means and the high speed ionization vacuum gauge when absence of the flat portion in the waveform is observed.

The pulsed gas ejecting means preferably includes a gas retention space connected to a supply source of the carrier gas containing the sample molecules, a flange partitioning the gas retention space and the vacuum chamber, a nozzle supported by the flange, a sealing material arranged on the nozzle and a valve body arranged within the gas retention space.

The nozzle is provided with a sheet surface confronting the gas retention space, an outer surface confronting the vacuum chamber on the opposite side of the sheet surface and a ventilation passage extending trough a space between the sheet surface and the outer surface.

The elastic sealing material is arranged on the sheet surface of the nozzle. The valve body is set such that, when opened, the gas flow in the ventilation passage is blocked. To this end, preferably, the lift distance of the valve body from the seal material is equal to or larger than 0.25 times of the opening diameter of the ventilation passage in the sheet surface.

The distance between the elastic sealing material and the valve body can be adjusted by adjusting movement of the nozzle from the flange in the axial direction by an adjusting means. A prescribed gap between the elastic sealing material and the valve body in the closed state can be maintained by leaving the sheet surface with the elastic sealing material from the valve body, when the prescribed gap cannot be maintained with the prescribed lift distance of the valve body due to thermal expansion of the elastic sealing material at high temperatures.

Preferably, the ventilation passage of the nozzle should be a divergent ventilation passage which is made up of a straight tubular portion of a constant diameter till a prescribed position from the sheet surface to the outer surface and a divergent tubular portion of increasing diameter from the prescribed position to the outer surface. The opening diameter of the ventilation passage is preferably 0.75 mm or larger in the sheet surface. The straight tubular portion is one third or smaller of the distance form the sheet surface to the outer surface and the divergent angle of the divergent tubular portion is in a range from 4 to 20 degrees.

In general, it is preferable that the laser beam irradiation system should be arranged such that the laser beam should be irradiated to the pulsed gas at a position distant from the outer surface by a distance larger than the full width half maximum length of the pulsed gas.

It is preferable that the ejecting direction of the pulsed gas by the pulsed gas ejecting means is same as the advancing direction of the sample molecule ions extracted by the repeller and extraction electrodes. To this end, the repeller electrode is provided with a mesh which allows passage of the pulsed gas to the laser beam irradiation point.

It is preferable to provide a multi-mirror assembly in order to form a focus region of laser flux at the laser beam irradiation point. The multi-mirror assembly is provided with a pair of confronting mirror sets each made up of a plurality of concave mirrors. Each concave mirror composing each mirror set is arranged with an angle to form the focus region of the laser flux at the laser beam irradiation point via reciprocal sequential reflection of the laser beam. The sample molecules undergo photo-reaction at the focus region of the laser flux.

Preferably, the multi-mirror assembly comprises first and second mirror sets each including a plurality of concave mirrors. The first and second mirror sets each includes a plurality of concave mirrors arranged in an annular orientation around a common axis.

Laser beam to be reciprocally reflected between two mirror sets is irradiated by the laser beam irradiation system and introduced towards a concave mirror of the first and second mirror sets. The introduced laser beam is led out of the device after prescribed times of reciprocal reflections between the two mirror sets.

Each concave mirror in the first mirror set is arranged so as to reflect laser beam to a corresponding concave mirror in the second mirror set. Each concave mirror in the second mirror set is arranged so as to reflect laser beam incident from one corresponding concave mirror in the first mirror set to another concave mirror adjacent to the one concave mirror. As a result, reflected laser beam moves sequentially and continuously in the circumferential direction of the mirror set.

Beams reflected by one of the concave mirror in the first mirror set and the concave mirror in the second mirror set are convergent whereas beams reflected by the other of the concave mirror in the first mirror set and the concave mirror in the second mirror set are parallel. The focal length of respective concave mirror is set such that the parallel laser beams are focussed in the prescribed region between the two mirror sets and the convergent laser beams are focussed outside the prescribed region. The laser beam irradiation point is formed in a prescribed region wherein the parallel laser beams are focussed and the convergent laser beams are not focussed.

The repeller and extraction electrodes are arranged with a relative gap not causing collision with the laser flux formed by the multi-mirror assembly. The both electrodes have sufficient confronting surfaces not warping the electric field generated between them. A reflectron type flight time mass spectrometer is preferably sued for the mass analyzing means.

Merits of the Invention

Thanks to the above-described construction, the present invention enables identification of dioxin isomers substituted tetrachrloride or more. The pulsed gas is most cooled near the transition point of the waveform from the flat-top trapezoidal pressure-time distribution to the triangular pressure-time distribution. Since the laser beam is irradiated to a position whereat the pulsed gas 24 is sufficiently cooled, the wavelength spectrum of the sample molecules obtained the mass analyzing means is very sharp in shape.

Use of the laser beam irradiation positioning means enables stable and easy determination of the laser beam irradiation point with respect to the gas flow at detection and analysis by the laser ionization mass spectrometer in accordance with the present invention. Conventionally, it has been indispensable to use laser beam having a pulse width of pico second or femto second for ionization of dioxins of tetrachloride or higher chloride. When decent laser beam irradiation point is determined through use of the laser beam irradiation positioning means, the wavelength spectrum of dioxins can be made sharp in shape even for laser beam of nano second and detection of the sample molecule parent ions of dioxins is enabled.

Use of a nozzle having a divergent ventilation passage can decrease spectrum (fragment spectrum) dissociated in mass spectrum. The nozzle with the divergent ventilation passage has an advantage of inhibiting gas stagnation in the ventilation passage. When the divergent ventilation passage is employed, the number of cooled sample molecules increases thereby generating little fragment spectrum and increasing signal intensity.

When laser flux generated by the multi-mirror assembly is irradiated to the sample molecules, the signal intensity of the detected gas can be enhanced drastically.

The photon density does not rise in excess and no sample molecule ions are dissociated when the multi-mirror assembly made up of the first and second mirror sets each including a plurality of concave mirrors is used, the parallel laser beams are focussed to the laser beam irradiation point and no convergent laser beams are focussed.

When the pulsed gas ejection device is heated, the elastic sealing material undergoes thermal expansion and no prescribed release gap is obtained through displacement of the valve body relative to the elastic sealing material, the prescribed release gap between the valve body and the elastic sealing material can be obtained by moving the sheet surface supporting the elastic sealing material of the nozzle distant from the valve body. This allows formation of pulsed ultrasonic molecular beam sufficing the choke flow requirements and the carrier gas in the ultrasonic molecular beam and sample molecules contained therein can be cooled to ultracold temperature.

Best Modes of the Invention

In the system shown in FIG. 1, carrier gas containing sample molecules is fed from a gas supply source G. The carrier gas passes through a gas flow-in tube 10 and is passed to a gas retention space 52 (FIG. 4) of a pulsed gas ejecting device 12. A part of the carrier gas is ejected in the form of a pulsed gas 24 into a vacuum vessel 17 and the remainder is returned to the gas supply source G via a heated gas flow-out tube 11.

The pulsed gas 24 ejected into the vacuum vessel 17 travels past a mesh 31 of a repeller electrode 18 and is subjected to irradiation of laser flux 9 at a position distant over a prescribed distance from an outer surface 30 of the pulsed gas ejecting device 12. Sample molecule ions 29 are generated by selective photo-reaction.

The generated sample molecule ions 29 are extracted in the direction towards a reflectron flight time type mass spectrometer 26 by the action of an electric field formed between the repeller and extraction electrodes 18, 19 and accelerated by the action of an electric field formed between the extraction and earth electrodes 19, 20. The accelerated sample molecule ions 29 are converged by an ion lens 21 and their orbit is curved by a deflection electrode 22. The sample molecule ions further travel though an exhaust aperture 23 and are introduced into the mass spectrometer 26.

The sample molecule ions 29 introduced into the mass spectrometer 26 travel through vacuum along an ion beam orbit 25, are reflected by an ion reflection electrode 27, further travel through the vacuum to MCP 28 and detected after conversion by an electric signal.

The laser flux 9 used for exciting the photo-reaction of the sample molecule in the pulsed gas 24 is generated and introduced by a laser beam irradiation system for irradiation to pulsed gas 24. In the laser beam irradiation system, excitation laser beam 3 generated at an exciting laser beam generating device 1 is reflected by a reflection mirror 5 and led to a laser beam mixing prism 6. Ionization laser beam 4 generated at the ionization laser beam generator 2 is similarly led to the laser beam mixing prism 6. The excitation laser beam 3 incident to the laser beam mixing prism 6 travels through the laser beam mixing prism 6 and the ionization laser beam 4 is reflected within the laser beam mixing prism 6. As a result, a double laser beam 7 is induced out of the laser beam mixing prism 6.

The double laser beam 7 is input into the multi-mirror assembly 8 in the vacuum vessel 17. As shown in FIG. 9, the multi-mirror assembly 8 includes a pair of confronting mirror sets 69 and 70. Each mirror set 69 or 70 includes a plurality of reflecting mirrors M1, M2, M3 . . . Mn. The angle of the mirror surface of each reflecting mirror M1, M2, M3 . . . Mn is set so that laser flux 9 reciprocates with sequential reflections between the two mirror sets 69 and 70 whilst rotating and moving in an annular direction. The laser beams reciprocating between the mirror sets 69 and 70 cross at a middle point to form a column shaped aggregation region Z of the laser flux 9. The sample molecules are subjected to photo reaction in the aggregation region Z of the laser flux 9.

The pulsed gas 24 ejected into the vacuum vessel 17 from the ventilation passage 13 of the pulsed gas ejecting device 12 shown in FIG. 1 includes "a leading portion gas", "a flat portion gas" and "a trailing portion gas". The pressure-time distribution of the pulsed gas 24 is believed to have a waveform such as shown in FIG. 16.

The leading portion gas is a gas portion ejected when the gas passage has not been opened sufficiently during the initial period of the opening operation of the valve body 51 (FIG. 4) of the pulsed gas ejecting device 12. This gas portion is in a flow state before the critical condition in which gas flow in the ventilation passage 13 is at a speed of mach 1. From a prescribed time point, its flow rate increases as time passes. Since this gas flow is not the one which blocked the ventilation passage 13, the gas flow translates at a speed slower than ultrasonic speed when ejected into the vacuum vessel 17 from the ventilation passage 13. The pressure of the gas travelling along the outer surface 30 increases too.

The flat portion gas is a gas portion ejected when the valve body 51 is sufficiently open after its complete opening operation. This gas portion travels through the ventilation passage 13 following the leading portion gas and has reached the critical condition wherein its speed is mach 1. Since this gas flow blocks the ventilation passage 13, no time-functional change in flow rate occurs. The pressure of the gas flow along the outer surface 30 undergoes no time-functional change too.

The trail portion gas is a gas portion ejected when the opening of the valve body 51 has been reduced by the closing operation of the valve body 51. This gas portion travels through the ventilation passage 13 following the flat portion gas. Its speed decreases from the critical condition of mach 1 to complete stop of the gas flow. Its flow rate decreases as time passes. Since this flow is not the one which closed the ventilation passage 13, the gas flow ejected into the vacuum vessel 17 from the ventilation passage 13 translates at a speed slower than the ultrasonic speed. The pressure of the gas flowing along the outer surface 30 decreases time-functionally too. The pulsed gas 24 of the flat-top trapezoidal pressure distribution including the leading, flat and trailing portion gasses translates in the vacuum vessel 17.

In FIG. 2, the pulsed gas 35 just after ejection into the vacuum vessel from the ventilation passage 13 has the flat-top trapezoidal pressure distribution 34 (t=t1). As the pulsed gas 35 translates, the retention period of the flat portion a of the pressure distribution 34 becomes shorter and the pulsed gas 35 transitions to a pulsed gas 37 with a pressure distribution 36 (t=t2).

As the pulsed gas 35 further translates in the vacuum vessel 17, the pulsed gas transitions to a pulsed gas 39 with a triangular pressure distribution without the flat portion a (t=t3). At this stage, the gas density assumes the highest level and the temperature assumes the lowest level. Consequently, it is believed most preferable to irradiate laser flux 9 to the pulsed gas 39 at the prescribed position whereat the pulsed gas 37 with the flat-top trapezoidal pressure distribution 36 transitions to the pulsed gas 39 with the triangular pressure distribution 38.

FIG. 7 shows the relationship between the pulse length L of the pulsed gases 61, 62 and 63 ejected from the ventilation passage 13 of the pulsed gas ejecting device 12 and the distance $X_L$ from the outer surface 30 to the laser beam irradiation point.

In FIG. 7(*a*), the pulse length L of the pulsed gas 61 is shorter than the distance $X_L$. The pulsed gas 61 is subjected to irradiation of laser flux 9 at a position distant from the outer surface 30 by the distance $X_L$.

In FIG. 7(*b*), the pulse length of pulsed gas 62 is equal to the pulse length of the pulsed gas 61. The pulsed gas 62 is subjected to irradiation of laser flux 9 at a position distant from the outer surface 30 by the distance $X_L$. This distance $X_L$ is, however, shorter than the distance $X_L$ in FIG. 7(*a*).

In FIG. 7(*c*), the distance $X_L$ is same as that in FIG. 7(*a*) but the pulse length L of the pulsed gas 63 is longer than the pulse length L of the pulsed gas 61 in FIG. 7(*a*).

In the case of the laser ionization mass spectrometer of the present invention, it is preferable that irradiation of the laser beam to the pulsed gas 61 at the relative position shown in FIG. 7(*a*).

The following description is directed to the flow conditions of the pulsed gas when the pulsed gases 35, 37, 39, 61, 62 and 63 are ejected into the vacuum vessel 17 from the ventilation passage 13 of the pulsed gas ejecting device 12 and translate in the vacuum vessel 17.

Assuming that the average speed of the leading portion gas of the gas is V1, the flow speed of the flat portion gas of the gas is V2 and the average speed of the trailing portion gas of the gas is V3, the relationship between the average speeds is believed to be given by V2≧V1≠V3. During translation in the vacuum vessel 17, the leading portion gas of the average speed V1 is taken over by the flat portion gas of the average speed faster than V2 and, through mixing therewith, the flat portion disappears.

The trailing portion gas of the average speed slower than V3 leaves away from the flat portion gas of the average speed V2. As a result, mixed gas is created within the pulsed gas as it leaves from the outer surface 30. At a prescribed position, the flat portion of the pulsed gas disappears completely and the pressure distribution of the pulsed gas transitions to the triangular pressure distribution.

The above-described speculation regarding the behavior of the pulsed gas in the vacuum vessel is different from the concept of the conventional kinetic theory of gas molecules.

The conventional concept develops as flows; The thermal energy generated by collision of the carrier gas molecules in the gas retention space 52 (FIG. 4) is lost gradually, i.e. the temperature of the gas lowers gradually, as the carrier gas translates in the vacuum chamber whilst losing its translation energy (translation speed) through adiabatic expansion and transitions to the translation energy. Stated otherwise, preservation of thermal energy is performed.

According to this kinetic theory of gas molecules, the gas flow ejected into vacuum from the ventilation passage of the nozzle increases its translation speed with increase in translation energy and the speed finally reaches the mach level. The final mach level (reached speed) is calculated in on the basis of the pressure in the gas retention space 52 and the diameter of the nozzle. The lowest cooling temperature is also calculated on the bases of this result. The distance of the reached mach level position from the nozzle outer surface can also be calculated.

The gas flow before reaching the distance is defined as a continuous irradiation without intermolecular collision and the gas flow after reaching the distance is defined as a molecular irradiation without intermolecular collision. In the region of the molecular flow, there is no lowering in gas temperature which is maintained constant due to absence of the intermolecular collision. So, in the concept of the kinetic theory of gas molecules, the pulsed gas ejected from the nozzle is regarded as a single gas equivalent to a constant state gas with no time-functional variation.

The pulsed gas 24 ejected from the pulsed gas ejecting device 12 into the vacuum vessel is believed to include the three local portions of different flow speeds as stated above. Since the three portion gases are ejected at the respective flow speeds, each portion gas performs its own adiabatic expansion.

Just after ejection from the ventilation passage 13 of the nozzle, the translation speeds differ from portion to portion. As translation continues, the leading portion gas is mixed with the flat portion gas causing collision between the gases. As a result, the thermal energy of the gas flow increases somewhat during the translation and the gas cooling effect decreases gently as the translation distance increases.

Although mixing of gas terminates at a prescribed distance from the outer surface 30, intermolecular collision within the gas flow continues. With further advance of the translation, intermolecular collision disappears and the pressure-time waveform of the gas flow transitions from the flat-top trapezoidal pressure distribution to the triangular pressure distribution.

At this stage of the process, the gas temperature reaches the lowest level and the density of the gas lowers further. So, it is effective to perform irradiation of the laser beam to the laser flux 9 at the position where the pressure distribution of the gas flow transitions from the flat-top trapezoidal pressure distribution 36 shown in FIG. 2(*c*) to the triangular pressure distribution 38. The position corresponds to the position distant from the outer surface 30 by the distance $X_L$. The relationship between the translation distances of the respective portion gases of the pulsed gas and the flow speed is shown in FIG. 17.

In order to contemplate the above-described process within the vacuum vessel 17, additional conditions need to be satisfied. In the system shown in FIG. 7(*a*), it is necessary that the pulse full width half maximum length (pulse length) L should be shorter than the distance $X_L$ from the outer surface 30 to the laser flux 9 irradiation point. In the following description, pulsed gas of a pulse length shorter than the distance $X_L$ is called “short pulsed gas”.

Pulsed gas of a pulse length longer than the distance $X_L$ is hereinafter called as “long pulsed gas”. In the case of the long pulsed gas such as shown in FIGS. 7(*b*) and (*c*), the space between the outer surface 30 and the laser flux 9 is filled with the gas flow and the condition is believed to be equivalent to a constant flow.

As a result of experimental studies, the inventors came to a view that the diameter of the ventilation passage 13 needs to be 0.75 mm or larger in order to eject the short pulsed gas 61 such as shown in FIG. 7(*a*).

Assuming that, in the arrangement shown in FIG. 16, short pulsed gas of a full width half maximum length of 40 μsec such as helium gas containing sample molecules translates into the vacuum chamber at a speed of 1000 m/sec and is subjected to laser beam irradiation at a position of 100 mm from the nozzle outer surface (the diameter of the ventilation passage is 1.1 mm ϕ and the pressure within the gas retention space is 1 atm), the pulse length is 40 μsec×1000 m/sec=40 mm.

Consequently, the laser beam irradiation point suffices the requirement of 40 mm or more from the nozzle outer surface. In the case of the long pulsed gas of the full width half maximum length of 200 μsec, the resultant pulse length is 200 mm. Since the space between the nozzle outer surface and the laser beam irradiation point is filed with the gas flow, the condition of the flow is regarded as equivalent to the above-described constant flow.

When the diameter of the ventilation passage 13 is 0.75 mm or larger and the ejected gas is a short pulsed gas as shown in FIG. 7(*a*), the gas density per one pulse is large and, at the position where laser flux 9 is irradiated, very little intermolecular collision in the pulsed gas is believed present.

The above-described pulsed gas of high density and short pulse with very little intermolecular collision is academically called “crystal flow”. Since gas is sufficiently cooled in the state of crystal flow, identification of tetrachloride or higher substituted dioxin isomers can be carried out by the laser ionization mass spectrometer in accordance with the present invention.

In FIG. 2, the pulsed gas 35 (FIG. 2(*a*)) having the flat-top trapezoidal pressure distribution 34 transitions to the pulsed gas 37 (FIG. 2(*b*)) having the flat-top trapezoidal pressure distribution 36 and transitions to the pulsed gas 39 (FIG. 2(*c*)) having the triangular pressure distribution 38. In this process, the optimum irradiation point of laser flux 9 can be determined through experimental observation using the laser beam irradiation positioning device 40. The concept of the construction of the laser beam irradiation positioning device 40 is shown in FIG. 3.

A vacuum accordion tube 41 fixing the pulsed gas ejecting device 12 is connected to the vacuum vessel 42. The pulsed gas ejecting device 12 is provided with the ventilation passage 13 for ejecting the gas in pulse mode into the vacuum vessel 42. A high speed ionization vacuum gauge 43 is arranged within the vacuum vessel 42. The vacuum vessel 42 is exhausted by a vacuum pump 44.

When a high speed ionization vacuum gauge 43 is arranged within the vacuum vessel 17 shown in FIG. 1, it is arranged in a movable fashion so as no to hinder analysis. The pulsed gas ejecting device 12 is connected to the vacuum vessel 17 too via the vacuum accordion tube 41.

When the vacuum vessel 42 is exhausted down to a vacuum of, for example, $1\times10^{-4}$ Pa, the carrier gas is supplied to the gas flow-in tube 10 of the pulsed gas ejecting device 12 and flow-back excessive carrier gas is exhausted through the gas flow-out tube 11. After this state is confirmed, a driving device 45 is activated for ejection of the carrier gas into vacuum.

After confirming ejection of the carrier gas into vacuum by, for example, an ionization vacuum gauge, it is confirmed that a filament of the high speed ionization vacuum gauge 43 is directed downstream. Then the driving device 46 of the high speed vacuum gauge is activated and it is confirmed that the filament of the high speed vacuum gauge 43 is lighted.

An oscilloscope 47 is activated and the voltage and current of the driving device 46 are adjusted to the half scales of respective meters. The pressure-time waveform of the carrier gas pulse is observed by the oscilloscope 47.

After the observation of the pressure-time waveform of the carrier gas pulse 24 is over, the voltage and current of the driving device 46 are adjusted and formation of the flat-top portion in the pressure-time waveform is confirmed.

One example of the observed pressure-time waveform is shown in FIG. 16. When the distance from the outer surface 30 of the nozzle to the high speed ionization vacuum gauge 43 is longer than the distance $X_L$ to the optimum laser beam irradiation point, it is unable to observe the pressure-time waveform of the carrier gas having the flat-top portion even through adjustment of the voltage and current of the driving device 46.

In this case, the accordion tube 41 is adjusted so as to bring the high speed ionization vacuum gauge 43 and the outer surface 30 closer to each other. This enables observation of the pressure-time waveform of the carrier gas having the flat-top portion shown in FIG. 16.

After confirmation of the pressure-time waveform, the distance between the outer surface 30 of the nozzle and the high speed ionization vacuum gauge 43 is gradually increased and the voltage and current of the driving device 46 are adjusted to confirm presence of the flat-top portion.

In change of the distance from the outer surface 30 to the high speed ionization vacuum gauge 43, the optimum laser beam irradiation point (distance X) is obtained near the distance ($X_L$) from the outer surface 30 of the position where the flat-top portion disappears.

Assuming that the optimum laser beam irradiation point is at the distance X and the position where the flat-top portion disappears is at the distance $X_L$ from the outer surface 30, experimental results indicate $0.5X_L<X<1.5X_L$, preferably $0.7X_L<X<1.3X_L$ and more preferably $0.86X_L<X<1.14X_L$. It is known that $X_L$ is also present at positions of the upper limit distance from the nozzle opening to the laser beam irradiation point $X_T$=70 mm or more. The limit of time resolution of the high speed vacuum gauge 43 and its driving device 46 is preferably rising time 5 μsec or shorter.

In calculation according to the above-described kinetic theory of gas molecule, it is assumed re the pulsed gas ejecting device 12 that helium gas is used for the carrier gas, the gas temperature (the temperature of the retention space 52) is 150° C., the gas pressure is 1 atm and the diameter of the ventilation passage 13 is 0.75 mm, the distance $X_T$ from the outer surface 30 of the nozzle to the laser beam irradiation point is 36.018 mm.

In contrast to this, FIG. 18 shows the result of the experiment in which small amount of 1.2-dichlorobenzene was mixed with the helium gas as the carrier gas by the method in accordance with the present invention and laser ionization mass analysis was performed.

FIG. 18 shows the wavelength characteristics of 1.2-dichlorobenzene in which the wavelength in nm is taken on the abscissa and the signal intensity in A.U. is taken on the ordinate. The experimental parameter was the distance X from the outer surface 30 to the laser beam irradiation point. The experiment covered the range of X=40 to 52 mm.

As a result, the spectrum intensity increased as the distance increased and became constant in the range of X=44 to 52 mm. The spectrum width decreased as the distance increased and became constant in the range of X=44 to 52 mm as the in the case of the spectrum intensity. The wavelength spectrum width depends on the gas cooling temperature. As the gas temperature lowers, the spectrum width decreases. It is clear from FIG. 18 that the gas temperature is constant in the range X=44 mm or larger.

Attention should be invited to the region encircled by dot lines in the illustration. The region is representative of the wavelength characteristics of an ion signal of 1.2-dichlorobenzen molecules contained in the leading portion gas of the pulsed gas. In contrast to the fact that the signal intensity of the spectrum peak does not change with distance, the signal intensity in this region decreases with distance. This indicates decrease in the density of the gas in the hot leading portion. As in the above-described case, the signal intensity is constant in the range of X=44 to 52 mm.

In general, gas pulse ejected into vacuum is regarded as a single gas. The gas density decrease in proportion to the square value of the distance. In practice, however, the gas pulse is not a single gas but made up of leading, flat and trailing portion gases.

According to the experimental result of the present invention, the ion signal intensity of 1.2-dichlorobenzen molecules contained in the flat portion gas does not decrease with increase in distance in the range of X=44 to 52 mm. This is believed to be caused by the fact that, in the range of X=44 to 52 mm, the hot and slow leading portion gas is taken over by the cool and fast flat portion gas, the former is absorbed by the latter, the gas density of the leading portion gas decreases and the flat portion gas maintains its density.

In the case of an experiment using the high speed ionization vacuum gauge 43, it was also confirmed that the distance X from the outer surface 30 (where the flat portion gas disappears) is 44 mm.

It will be well understood from the foregoing results that the method in accordance with the present invention is totally different in concept from the method in accordance with the conventional logical calculation.

FIG. 4 depicts one example of the pulsed gas ejecting device 12 which is able to eject a pulsed gas 35 having the flat-top trapezoidal pressure distribution 34 shown in FIG. 2 into the vacuum vessel 17.

In FIG. 4, the pulsed gas ejecting device 12 includes a flange 48 attached to an opening 54*a* of a vacuum vessel 54 and a cover element 55 forming the gas retention space 52 between itself and the flange 48. The flange 48 is provides with an inner surface 48*a* facing the inside of the vacuum vessel 17 and a gas contact surface 48*b* located on the opposite side whilst facing the gas retention space 52. The flange 48 blocks between the vacuum vessel 17 and the atmosphere and the gas retention space 52. The flange 48 is provided with a nozzle holding recess 48*c* and a nozzle through hole 48*e* which extends between the bottom of the nozzle holding recess 48*c* and the gas contact surface 48*b*.

The gas retention space 52 is defined by the inner wall of the recess 55*a* of the cover element 55 and the gas contact surface 48*b* of the flange 48. The gas retention space 52 is connected to the gas supply source G via a passages 55*b*, 55*c* of the cover element 55 and the passage 55*b* is connected to the gas supply source. The passage 55*c* and the passage 55*c* are connected to the gas supply source via the gas flow-in tube 10 and the gas flow-out tube 11, respectively. The gas flow-in tube 10 and the gas flow-out tube 11 are blocked from the atmosphere.

The nozzle 49 is provided with a talon 49*a*, a shaft 49*b* and the ventilation passage 13 passing through the center of the shaft 49*b*. The nozzle 49 is supported through engagement with the nozzle holding recess 48*c* and the nozzle thorough hole 48*e* so as to extend through the gap between the inner surface 48*a* of the flange 48 and the gas contact surface 48*b*.

The nozzle 49 is further provided with a sheet surface 53 facing the gas retention space 52 and an outer surface 30 located on the opposite side whilst facing the inner surface of the vacuum vessel 17 and the ventilation passage 13 extends through a gap between the both surfaces. A ring-shaped spacer 56 is interposed between the talon 49*a* of the nozzle 49 and the bottom surface 48*d* of the nozzle holding recess 48*c*. The talon 49*a* is fixed to the flange 48 by a nozzle holder 57.

As a consequence, the height of the sheet surface 53 can be finely adjusted by proper choice of the thickness and number of the spacer 56.

The elastic sealing element 50 is arranged on the sheet surface 53 of the nozzle 49. A hair-pin type valve body 51 equivalent to the conventional valve body 51 is provided with a lower portion 51*a* and an upper portion 51*b*. Being supported by the gas contact surface 48*b* of the flange 48, the valve upper portion 51*b* in the closed position contacts the elastic sealing element 50 to close the ventilation passage 13. In the open position the valve upper portion 51*b* leaves away from the elastic sealing element 50 to open the ventilation passage 13. The position of the valve 51 is controlled electromagnetic driving.

Then, the sample gas containing sample molecules and introduced from the carrier gas supply source G into the gas retention space 52 is heated by the heated flange 48, cover element 55, gas flow-in tube 10 and the gas flow-out tube 11 to a same level of temperature. The gas stored in the gas retention space 52 is normally blocked from the inside of the vacuum vessel 17 by the elastic sealing element 50 arranged between the valve body 51 and the nozzle 49. For ejection of the gas into the vacuum vessel 17 through the nozzle 49 pulsed current is applied to the valve body 51 to raise the upper portion 51*b* of the valve body 51.

For example, when the sealing element 50 has a cross sectional surface such as shown in FIG. 5*a* at a relatively low temperature, the upper portion 51*b* of the valve body 51 is able to be displaced over a distance h1 from the closed position shown with imaginary lines to the open position shown with solid lines and a release gap of δ 1 is formed between itself and the sealing element 50.

As the temperature of the sealing element 50 rises due to heating of the flange 48, the sealing element 50 expands as shown in FIG. 5(*b*) under the low temperature condition to produce a height difference of δ 2. The upper portion 51*b* of the valve body 51 in the closed position is in a condition pushed up towards the open position by a distance of δ 2 when compared to the low temperature condition. As the valve body 51 is displaced to the open position shown with the solid lines, the release gap formed between the upper position 51*b* and the sealing element 50 becomes equal to δ 3 (δ 1-δ 2) and no sufficient release gap δ 1 can be formed under low temperature condition.

As a result, the amount of gas ejected from the nozzle 49 per unit time decreases and no sufficient ultrasonic molecular beams can be formed. So, in the ejecting device in accordance with the present invention, the thermal expansion of the sealing element 50 at the using temperature is taken into consideration in advance and the nozzle 49 is lowered as shown in FIG. 5(*c*) with respect to the flange 48 by corresponding choice of the thickness and number of the spacer 56. This enables lowering of the altitude of the sheet surface 53 by δ 2 from the position shown in FIG. 5(*b*).

Therefore, when the sealing element 50 has thermally expanded and the prescribed release gap δ 1 with respect to the sealing element 50 cannot be obtained by displacement of the upper portion 51*b* of the valve body 51, the prescribed release gap δ 1 with respect to the sealing element 50 at the open position of the upper portion 51*b* of the valve body 51 can be obtained by leaving the sealing element 50 with the nozzle 49 from the upper portion by the distance of δ 2.

For the gas ejected into the vacuum vessel 17 to be an ultrasonic flow, it is necessary that the flow in the ventilation passage 13 reaches the critical condition of mach 1 level and the flow rate is choked, i.e. the flow becomes a choke flow. A time-continuous gas ejected from the ventilation passage 13 into the vacuum vessel 17 becomes a choke flow.

A time-discontinuous gas ejected from the ventilation passage 13 into the vacuum vessel 17 does not always become a choke flow. As long as the distance at which the valve body upper portion 51*b* within the pulsed gas ejecting device 12 transitions from the closed to open position is below a prescribed value, no choke flow starts.

FIG. 6 schematically shows the condition under which the pulsed gas ejected from the pulsed gas ejecting device 12 becomes a choke flow. In the illustration, (a) indicates the relationship between the pulsed gas ejecting device 12 and the flux of the gas and (b) indicates the flux of the gas in a magnified fashion.

During displacement of the valve body upper portion 51*b* from the closed to the open position, the gas ejected from the ventilation passage 13 into the vacuum vessel 17 induces the condition of a choke flow. When the valve body upper portion 51*b* displaces from the closed position, the gas flow rate V0 within the valve body and the gas flow rate Vn at the outer surface 30 are defined and they are formulated as follows;

$$V_n=Q/A_n=4Q/\pi D^2$$

$$V_0=Q/A_0=Q/\pi d_0 h$$

Here $d_0$ is present in the valve body and indicates the diameter of the flux of the gas 59 flowing into the ventilation passage 13, D is the diameter (the diameter of the gas flux 60 traveling in the ventilation passage 13) of the ventilation passage, h is the height of the flux of the gas 59, i.e. the lift height of the seal element 50 (FIG. 4) of the valve body upper portion 51*b*. Q is the amount of gas which is assumed to present no change above and below the ventilation passage 13. For ejection of the choke flow from the ventilation passage 13 into the vacuum vessel 17, it is necessary to suffice the condition of $V_n \geqq V_0$. Then the following relationships are resulted.

$$4Q/\pi D^2 \geqq Q/\pi d_0 h$$

$$Hd_0 \geqq D^2/4$$

Assuming the approximation regarding the diameter of a flux 61 and the ventilation passage 13 is given by $$D_0 \geqq D$$

the above-described relationships are translated as follows;

$$h \geqq D/4=0.25D$$

Thus, the condition for production of a choke flow is determined. It is necessary for the pulsed gas ejecting device 12 that the distance from the closed to open position is 0.25D or larger. Thus, the choke flow condition is determined depending upon the lift height h and the ventilation passage diameter D.

When the valve body upper portion 51*b* displaces from the closed position contacting the sealing element 50 (FIG. 4) to the open position distant from the closed position by a distance 0.25D or more, the pulsed gas ejected from the ventilation passage 13 assumes a choke flow condition equivalent to the condition of the time-continuous gas constantly ejected from the ventilation passage into the vacuum vessel 17. Since the gas ejected into the vacuum vessel 17 is a closed flow, its flow rate becomes constant. That is, the gas ejected into the vacuum vessel 17 in pulse mode includes a flat portion of constant flow rate which does not depend on lapse of time.

When high temperature of the pulsed gas ejecting device 12 causes thermal expansion of the sealing element 50 and, as a result, the prescribed release gap with respect to the sealing element 50 cannot be obtained by displacement of the valve body 51 over the prescribed distance, the sheet surface 53 of the nozzle 49 supporting the sealing element 50 is moved away from the valve body, or by leaving the sealing element 50 and the valve body 51 from each other by another suitable means, the prescribed release gap with respect to the sealing element 50 can be obtained at the open position of the valve body 51. This enables generation of pulse ultrasonic molecular beam and carrier gas and sample molecules contained therein can be cooled to a cryogenic level.

In FIG. 1, it is preferable to use the laser flux 9 multi-reflected by the multi-mirror assembly 8 for photo-reaction the sample molecules contained in the pulsed gas 24.

As shown in FIG. 9, the multi-mirror assembly 8 is a sort of optical image relay system made up of a confronting arrangement of lots of concave mirrors M1, M2 . . . Mn for reflecting laser beams and an ionization zone Z of high ionization efficiency can be formed at the center portion of the system where the laser beams cross.

The laser flux 9 in the multi-mirror assembly 8 is able to form a reflecting optical path like strings of a tambour as a whole in which, as shown in FIG. 9(*a*), circular column shaped laser beams (parallel beams) on the go-route are collected at the center portion on the axis and, as shown in FIG. 9(*b*), laser beams (convergent beams) on the return route travel outer portion distant from the axis.

It was confirmed theoretically and experimentally and reported to public (for example, see Yasuo SUZUKI, et. al., Analytical Science 2001, VOL. 17 SUPPLEMENT i563) that laser flux 9 formed by the multi-mirror assembly 8 causes photo-reaction of sample molecules contained in carrier gas and, as a result, the amount of sample molecular ions 29 generated is larger than the amount of sample molecule ions generated by a single laser beam. According to the report, in experiments using benzene gas, about 1000 times of rise in sensitivity was achieved when compared to benzene molecular ions generated by a single laser beam.

FIG. 10 depicts the arrangement of the concave mirrors in the multi-mirror assembly 8 and the shape of the laser flux 9 reflected with some exaggeration. FIG. 10(*a*) depicts the laser beam on the go-route from the mirror set 69 to the mirror set 70, FIG. 10(*b*) depicts the laser beam on the return-route from the mirror set 70 to the mirror set 69 and FIG. 10(*c*) depicts the relationship between the laser beam and respective concave mirrors in a exploded fashion.

One concave mirror M1 (FIG. 10(*a*)) in the mirror set 70 receiving a parallel laser beam past the opening 71 reflects the incident laser beam towards one concave mirror M2 (FIG. 10(*b*)) in the confronting mirror set 69 in a converged fashion. On receipt of the converged laser beam, the concave mirror M2 reflects the incident laser beam towards a concave mirror M3 (FIG. 10(*a*)) adjacent the concave mirror M1 in the mirror set 70. In such a way, the laser beam is reciprocally reflected between the mirror sets 69 and 70 in a manner to rotate in the circumferential direction and, finally, sends out the laser beam past the opening 72.

Each concave mirror M1, M2 . . . M6 has a same focal length and the distance between a pair of confronting concave mirrors doubles the focal length. When the in-coming laser beam is a parallel beam, the laser beam advancing from the mirror set 70 to the mirror set 69 (return-route) is a convergent beam having its focus F at the midway between the confronting concave mirrors (FIG. 10(*b*)) and the laser beam advancing from the mirror set 69 to the mirror set 70 (go-route) is a parallel beam crossing near the midway between a pair of confronting concave mirrors (FIG. 10(*a*)).

Preferably, the multi-mirror assembly 8*b* shown in FIG. 11 is used. The multi-mirror assembly 8*b* is made up of two mirror sets 69 and 70 arranged confronting each other on a same axial line with each set being made of a plurality of concave mirrors M1, M2 . . . M6 oriented in an annular arrangement.

FIG. 11 depicts the arrangement of the concave mirrors and the shape of the reflected laser flux 9 in an exaggerated fashion. (a) shows the laser beam advancing on the go-route from the mirror set 69 to the mirror set 70, (b) shows the laser beam advancing on the return-route from the mirror set 70 to the mirror set 69 and (c) shows the relationship between the respective concave mirrors and the laser beam.

One concave mirror M1 (FIG. 11(*a*)) in the mirror set 70 receiving a parallel laser beam past the opening 70 reflects the incident laser beam towards one concave mirror M2 (FIG. 11(*b*)) in the mirror set 69 in the form of a convergent beam focussing at the midway between the mirror sets. On receipt of the laser beam, the concave mirror M2 reflects the laser beam towards a concave mirror M3 (FIG. 11(*a*)) adjacent the concave mirror M1 in the mirror set 70. In such a way, the laser beam is reciprocally reflected between the mirror sets 69 and 70 in a manner to be rotated in the circumferential direction and led outwards past the opening 72.

When the in-coming laser beam is a parallel beam, the laser beam advancing from the mirror set 70 to the mirror set 69 (return-route) becomes a convergent beam focussing at F between the confronting concave mirrors (FIG. 11(*b*)) and the laser beam advancing from the mirror set 69 to the mirror set 70 (go-route) becomes a parallel beam (FIG. 11(*a*)) crossing near the midway between the confronting concave mirrors.

The focus F of the convergent beam may be dislocated to an arbitrary position as shown in FIGS. 11(*b*) and (*c*). That is, the mirror sets 69 and 70 of the multi-mirror assembly 8*b* are set so that the sum of the focal lengths f1 and f2 of the confronting concave mirrors should be equal to the distance d between the both concave mirrors (d=f1+f2). By changing f1 and f2 freely whilst keeping d constant, the focus of the return-route can be dislocated towards left or right from the center. This enables arbitrary setting of the laser beam intensity in the ionization zone Z.

By collecting the focuses to the center, it is possible to perform disassociation of the parent ions of the sample minim molecules. As a result, the parent ions and fragment ions, or parent ions only, or the fragment ions only can be induced into the mass spectrometer by the operation of an attractive electric field.

The amount of the toxic substances, in particular dioxins contained in the gas of the gas supply source G is, however, very small. As a consequence, for quantitative analysis to be performed by the laser ionization mass spectrometer of the present invention, it is necessary as shown in FIGS. 1, 2 and 7, the translating direction of the pulsed gas 24 ejected from the pulsed gas ejecting device 12 into the vacuum vessel 17 and the advancing direction of the sample molecule ions 29 should be in a same direction at the laser beam irradiation point, thereby enhancing the device sensitivity. It was confirmed experimentally that such coincidence in direction makes the device sensitivity 10 times or more of the device sensitivity for inconsistency between the translating direction of the pulsed gas 24 and the advancing direction of sample molecule ions 29.

In order to make the translating direction of the pulsed gas 24 same as the advancing direction of the sample molecule ions 29 at the laser beam irradiation point, a repeller electrode

18 provided with a mesh 31 and an extraction electrode 19 provided with a mesh 32 are used. The repeller electrode 18 provided with the mesh 31 does not disturb the flow of the pulsed gas 24. The extraction electrode 19 provided with the mesh 32 does not disturb the flow of the pulsed gas 24 and allows passage of the sample molecule ions with transmissivity of about 100%. The direction to be generated by the repeller electrode 18 and the extraction electrode 19 is preferably same as their translating direction of the pulsed gas 24.

An exhaust aperture 23 is formed between the vacuum vessel 17 and the mass spectrometer 26. This well prevents flow-in of the pulsed gas 24 passed through the mesh 33 of the earth electrode 20 and advancing in a same direction as the advancing direction of the sample molecule ions 29 into the mass spectrometer 26.

At irradiation of the laser flux 9 formed by the multi-mirror assemblies 8, 8*a* and 8*b* in FIGS. 1, 9, 10 and 11 to sample molecules contained in the carrier gas, it is necessary to avoid collision of the beam 78 on the go-route and the beam 79 on the return-route of the laser flux 9 with the repeller electrode 74 and the extraction electrode 77. It is thinkable to broaden the gap between the electrodes 74 and 77. This, however, disturbs the electric field generated between the electrodes 74 and 77, the orbit 25 of the sample molecule ions is warped, the ion beam 25 of the prescribed diameter may diverge or converge, and, as a consequence, the total amount of the sample molecule ions 29 is believed to decrease before arrival at the MCP28. In order to obviate this problem, the confronting surfaces of the electrodes 74 and 77 are enlarged, the gap between the electrodes is enlarged and the meshes 31 and 32 are employed as shown in FIGS. 1 and 12(*b*) in the laser ionization mass spectrometer of the present invention.

In FIGS. 13 to 15, 1200 V of voltage is applied to the repeller electrode 18 or 74 and 800 V of voltage is applied to the extraction electrode 19 or 75, respectively. FIG. 13 depicts an electric field vector generated between poles when a square repeller electrode 74 of 1 inch×1 inch and a square extraction electrode 75 of 1 inch×1 inch are arranged with an intervening gap of 0.5 inch.

FIG. 14 depicts an electric field vector generated between poles when a square repeller electrode 74 of 1 inch×1 inch and a square extraction electrode 75 of 1 inch×1 inch are arranged with an intervening gap of 1 inch.

FIG. 15 depicts an electric field vector generated between poles when a square repeller electrode 18 of 3 inch×3 inch and a square extraction electrode 19 of 3 inch×3 inch are arranged with an intervening gap of 1 inch.

In FIGS. 13 and 15, the directions of the electric field vectors generated between poles are same as the direction of the pulsed gas 24. In FIG. 14, however, the direction of the electric field vector is not same as the direction of the pulsed gas 24. So, in order to produce sample molecule ions 29 by the laser flux 9 generated by the multi-mirror assemblies 8, 8*a* and 8*b*, it is necessary to employ a relatively large pole to pole confronting surfaces and a relatively large inter-pole gap.

A nozzle 65 having a ventilation passage 13 of a different configuration such as shown in FIG. 8 can be employed. In the case of the nozzle 65*b* shown in FIG. 8(*b*), the ventilation passage 13 has a constant diameter D from the sheet surface 64*b* to the outer surface 66*b*. In the case of the nozzle 65*a* shown in FIG. 8(*a*), the ventilation passage 13*a* has a constant diameter D from the sheet surface 64*a* to a prescribed position and diverges conically with a prescribed angle of divergence from the position to the outer surface 66*a*.

Preferably, a nozzle 65*a* having a divergent ventilation passage 13*a* is employed. More preferably, the straight portion of the divergent ventilation passage 13*a* has a diameter of 0.75 mm or larger, the length of the straight portion is 1 third or shorter of the distance from the sheet surface 64*a* to the outer surface 66*a* and the angle of divergence of the conical portion is in a range from 4 to 20 degrees.

The nozzle 65*a* having the divergent ventilation passage 13*a* is patterned after the nozzle provided with the Laval type ventilation passage disclosed in Trans. ASME, Series D, J. Basic Eng. 84-4, (1962) p. 434 by Robert E. Smith and Roy J. Matz. This model was proposed for application to a study of flow rate measurement in a wind tunnel. This nozzle is generally used for formation of clusters and widely for cluster mass spectrometers. In the case of the present invention, however, the model is used not for cluster formation but for employment of the divergent ventilation passage 13*a* in order to enhance the sensitivity of the mass spectrometer and quality of the mass spectrum.

When compared with the straight ventilation passage 13*b*, employment of the divergent ventilation passage 13*a* results in 3.06 to 3.62 times enhancement of the mach level of the gas ejected at the exit of the ventilation passage. This promotes cooling effect of the pulsed gas and the gas temperature at the exit of the ventilation passage 13*a* is lowered 0.51 to 0.39 times.

As shown in FIG. 8(*b*), a gas stagnating portion 67*b* is generated between the gas flow 68*b* passing the ventilation passage 13 and the nozzle 65*b*, and the cooled gas flow 68*b* and hot gas stagnating in the gas stagnating portion 67*b* are mixed and ejected via the exit of the ventilation passage 13*b* into the vacuum vessel 17. Whilst, as shown in FIG. 8(*a*), the gas stagnating portion 67*a* between the gas flow 68*a* passing the divergent ventilation passage 13*a* and the nozzle 65*a* is inhibited to the minimum dimension and cooled gas flow 68*a* only is ejected from the exit of the ventilation passage 13*a* into the vacuum vessel 17.

The wavelength spectrum of 2,3,7,8-tetrachlorodibenzo-para-dioxin (hereinafter referred to as "2,3,7,8-TeCDD") sample molecule is shown in FIG. 20. As shown in FIG. 1, the two-color-two-photon ionization process was used for ionization of the sample molecules contained in the carrier gas. The laser beam 3 of the first color was a laser beam of variable wavelength and the laser beam 4 of the second color was a fifth higher harmonics of Nd:YAG laser beam (hereinafter referred to as "213 nm").

The wavelength spectrum on the upper side in the illustration is an ionized wavelength spectrum obtained by irradiation of laser beam to a pulsed gas ejected from the ventilation passage 13 at a displacement distance of 0.25D or shorter of the valve body upper portion 51*b* shown in FIG. 6. Therefore, no flat-top trapezoidal pressure distribution such as shown in FIG. 2(*a*) is formed in this pulsed gas.

The wavelength spectrum on the lower side in the illustration is an ionized wavelength spectrum obtained by irradiation of laser beam to a pulsed gas ejected from the ventilation passage 13 at displacement distance of 0.25D or longer of the valve body upper portion 51*b*. A flat-top trapezoidal pressure distribution such as shown in FIG. 2(*a*), (*b*) is formed in this pulsed gas.

The laser beam irradiation point is located near the position whereat the pressure distribution of the pulsed gas transitions from the flat-top trapezoidal type to the triangular type shown in FIG. 2(*c*). The pulse time half width maximum length of the pulsed gas used is 40 μsec for the respective cases.

When all of the following three conditions are not satisfied, the resultant wavelength spectrum is broad as shown on the upper side in FIG. 20. In condition one, the valve body upper portion 51*b* of the pulsed gas ejecting device 12 is displaced from the closed position by a distance of 0.25D or longer. In condition two, the laser beam is irradiation at a position near the position whereat the pressure distribution of the pulsed gas 24 transitions from the flat-top trapezoidal type 36 in FIGS. 2(*a*), (*b*) to the triangular type 38 in FIG. 2(*c*). In condition three, a gas pulse shorter than the distance between the laser beam irradiation point and the nozzle outer surface 30 is present. This is because the pulsed gas 24 ejected from the ventilation passage 13 is not cooled sufficiently.

When the above-described three conditions are all satisfied, the wavelength spectrum is sharp as shown on the lower side in FIG. 20. This is because the pulsed gas 24 ejected from the ventilation passage 13 is cooled sufficiently.

Conventionally use of a laser beam of a pulse width of pico second or femt second has been indispensable for ionization of dioxins higher than tetrachloride. Thanks to employment of the mass spectrometer of the present invention, however, gas can be cooled sufficiently, the wavelength spectrum of dioxins becomes sharp and ionization of dioxins is enabled even with laser beam of nano second.

When the gas is not cooled sufficiently, detection of sample molecule parent ions cannot be performed using one-color-two-photon ionization. By cooling gas sufficiently, one-color-two-photon ionization even by nano second laser beam is enabled.

When detecting 2,3,7,8-TeCDD parent ions by one-color-two-photon ionization method using nano second laser beam, the life cycle of the excited monoplet condition is in the order of nano second due to sufficient cooling of gas ejected from the nozzle. Therefore, the ionization in this case is believed to be in a monoplet condition. The ionization in parent ion detection of sample molecules by the two-color-two-photon ionization is believed to be on one hand an ionization in a excited monoplet condition in nano second order and, on the other hand, an ionization from excited triplet condition which is resulted from intersystem crossing from the excited monoplet condition.

Generally, the excited triplet condition is smaller in energy difference from the ground state than the excited monoplet condition. As a conseqence, it is said that ionization from the excite triplet condition requires use of laser beam having larger photon energy than ionization from the excited monoplet condition. In order to endorse this general understanding, it is recommended to investigate the delay time characteristics between laser beam 3 of the first color in signal intensity and laser beam 4 of the second color in signal intensity, both by the two-color-two-photon ionization method. The result of the characteristics investigation is shown in FIG. 21.

The upper portion in FIG. 21 denotes the result of the delay time characteristics when the wavelength of the first color laser beam 3 is 310.99 nm and the wavelength of the second color laser beam 4, which is the fourth higher harmonics of the Nd:YAG laser beam, is 266 nm.

The lower portion in FIG. 21 denotes the result of the delay time characteristics when the wavelength of the first color laser beam 3 is 310.99 nm and the wavelength of the second color laser beam 4, which is the fifth higher harmonics of Nd:YAG laser beam, is 213 nm.

In the case of the result given in the upper portion in FIG. 21, it was observed that the detected signal increased or decreased for the delay time of several nano seconds. In the case of the result given in the lower portion in FIG. 21, it was observed that the detected signal increased for the delay time of several nano seconds and, thereafter, the detected signal decreased as the delay time approached the order of 1 micro second. The result in the lower portion in FIG. 21 denotes that the ionization from the excite triplet condition is in the order of several micro seconds.

In the upper portion in FIG. 21, the detected signal appears at a time of several nano seconds level shorter when compared with the time characteristics in the lower portion. This indicates the fact that ionization from the excited triplet condition is impossible although ionization from the monoplet condition only is possible. The fact that the detected signal obtained by ionization from the excited monoplet condition is in the order of nano second is different from the conventionally believed process.

FIGS. 22(*a*), (*b*) denote the wavelength spectrums of 2,3,4,7,8-pentacholoro-dibenzofuran (hereinafter referred to as "2,3,4,7,8-PeCDF") and 1,2,3,7,8-pentachloro-dibenzofuran (hereinafter referred to as "1,2,3,7,8-PeCDF" caused by difference in configuration of the ventilation passage 13.

FIG. 22(*a*) denotes the wavelength spectrum of sample molecules when a nozzle 65*b* (FIG. 8(*b*)) having a straight type ventilation passage 13*b* of 0.75 mm diameter is used. FIG. 22(*b*) denotes the wavelength spectrum of sample molecules when a nozzle 65*a* (FIG. 8(*a*)) having a divergent type ventilation passage 13*a* of 1.1 mm diameter at the sheet surface 64*a* is used. The wavelength spectrum shown in FIG. 22(*b*) is more preferable for disassociation of the dioxin isomer than the wavelength spectrum shown in FIG. 22(*a*).

Use of the nozzle 65*a* having the divergent type ventilation passage 13*a* can reduce the spectrum disassociated in mass spectrum (fragment spectrum). As stated above, the nozzle 65*a* provided with the divergent type ventilation passage 13*a* has an advantage of prohibiting gas stagnation in the ventilation passage 13*a* to a minimum level. No disassociation is believed to take place when sample molecules contained in the pulsed gas 24 ejected from the ventilation passage 13*a* is cooled sufficiently. When hot gas is mixed with cooled gas, however, sample molecules contained in the hot gas are believed to start disassociation.

FIG. 23 denotes the difference in mass spectrum of 2,3,7,8-TeCDD between use of the nozzle 65*b* with the straight type ventilation passage 13 and use of the nozzle 65*a* with the divergent type ventilation passage 13*a*. In either ventilation passage 13*a* or 13*b* the diameter at the sheet surface 64 is equal to 1.1 mm.

According to this result, use of the straight type ventilation passage 13*b* generates fragment spectrum and the intensity of the parent spectrum is small. Whereas, use of the divergent type ventilation passage 13*a* generates little fragment spectrum and the signal intensity is increased. This indicates increase in number of the cooled sample molecules. As a consequence, it is believed preferable to use the nozzle 65*a* with the divergent type ventilation passage 13*a* than the nozzle 65*b* with the straight type ventilation passage 13*b*.

FIG. 24 depicts irradiation cycles (pulsed gas time) when the laser flux 9 generated by the multi-mirror assembly 8 in FIG. 1 is irradiated to benzene sample molecules and dependency of the amount of benzene ions on the laser beam energy.

FIG. 24 depicts comparison of benzene gas signal intensity between the conventional Jet-REMPI process (for example, one time of laser beam irradiation and laser beam output of 1 mJ) and the process by use of the laser beam ionization mass spectrometer in accordance with the present invention using the multi-mirror assembly 8 (for example, 8 times of laser beam irradiation and laser beam output of 5 mJ). It will be clear that a difference in temperature of about 1000 times is present.

As a consequence, it is believed preferable to employ multiple irradiation of laser beam to the pulsed gas 24 through use of the multi-mirror assemby 8. In FIG. 24, the abscissa indicates a function plotted in consideration of the laser beam 7 energy incident to the multi-mirror assembly and the irradiation time to the pulsed gas 24.

When the multi-mirror assembly 8*b* made up of the first and second mirror sets 69 and 70, each including a plurality of concave mirrors, is used, parallel laser beam focus at the laser beam irradiation point, no focus of convergent laser beam is encompassed, the photon density does not increase in excess and no disassociation of the sample molecules starts. In addition, detection sensitivity is enhanced several times when compared with use of multi-mirror assembly 8 or 8*a*.

INDUSTRIAL APPLICATIONS

The present invention is effective for identification and quantification of small amount of substances contained in carrier gas through use of a mass spectrometer in which carrier gas containing dioxin sample molecules is ejected from a nozzle of a ejection device provided with a high speed pulse valve into a vacuum vessel and laser beam is irradiated to the gas flow for selective ionization of the sample molecules.

BRIEF DESCRIPTION OF THE DRAWINGS

FIG. 1 is a simplified perspective view of the laser ionization mass spectrometer, FIG. 2 is a simplified view of pulsed gas translating in a vacuum chamber, FIG. 3 is a simplified view of the optimum laser beam irradiation positioning device, FIG. 4 is a detailed view of the pulsed gas ejecting device, FIG. 5 depicts the operation of the pulsed gas ejecting device, FIG. 6 is a view showing the conditions necessary for making the pulsed gas ejected from the pulsed gas ejecting device be a choke flow, FIG. 7 is a simplified view of the relationship between the pulse length of the pulsed gas and the laser beam irradiation point, FIG. 8 is a simplified view of the nozzle provided with the straight type ventilation passage and the nozzle provided with the divergent type ventilation passage including the carrier gas flowing the respective ventilation passages, FIG. 9 is a view for showing the multi-mirror assembly, FIG. 10 is a view for showing the multi-mirror assembly, FIG. 11 is a view for showing the multi-mirror assembly, FIG. 12 is a view for showing the repeller and extraction electrodes, FIG. 13 is a view showing the result of calculation of the electric field pattern generated between the repeller and extraction electrodes, FIG. 14 is a view showing the result of calculation of the electric field pattern generated between the repeller and extraction electrodes, FIG. 15 is a view showing the result of calculation of the electric field pattern generated between the repeller and extraction electrodes, FIG. 16 is a graph showing the pressure distribution of the gas ejected from the nozzle, FIG. 17 is a graph showing the relationship between the translation distance and the flow speed of the three componental gas flows making up the gas pulsed gas, FIG. 18 is a graph for showing the wavelength characteristics of 1,2-dichlorobenzene, FIG. 19 is a view for showing the hair-pin type valve body used for the pulsed gas ejecting device, FIG. 20 is a graph for showing the sufficiently cooled condition of the mixed gas ejected from the ventilation passage and containing 2,3,7,8-TeCDD standard sample molecules and the result of observation of the one-color-two-photon ionization wavelength spectrum and two-color-two-photon ionization spectrum by laser ionization mass analysis in an insufficiently cooled condition, FIG. 21 is a graph for showing the change in amount of ion signal resulted from change in time span between the exciting laser beam and ionization laser beam (266 nm and 213 nm used) when the carrier gas containing sufficiently cooled 2,3,7,8-tetrachlorodibenzo-para-dioxin standard sample molecules is two-color-two-photon ionized by a laser beam of nano second pulse width, FIG. 22 is a graph for showing the result of observation of the wavelength spectrums of 1,2,3,7,8-pentachloro-dibenzofuran and 2,3,4,7,8-PeCDF according to difference in ventilation passage configuration, FIG. 23 is a graph for showing the result of observation of the mass spectrums due to difference between the divergent and straight type nozzles when the carrier gas containing 2,3,7,8-tetracholorodibenzo-para-dioxin standard sample molecules is two-color-two-photon ionized by laser beam of nano second pulse width, and FIG. 24 is a graph for showing dependency of the amount of benzene ion signal on the laser beam irradiation cycle (irradiation time) when the laser flux generated by the multi-mirror assembly is irradiated to benzene sample molecules.

DESCRIPTION OF THE SYMBOLS

1: exciting laser beam generating device
2: ionization laser beam generating device
3: exciting laser beam
4: ionization laser beam
5: full reflecting mirror
6: laser beam mixing prism
7: double laser beam
8: multi-mirror assembly
8*a*: multi-mirror assembly
8*b*: multi-mirror assembly
9: laser flux
10: gas flow-in pipe
11: gas flow-out pipe
12: pulsed gas ejecting device
13: ventilation passage
13*a*: divergent ventilation passage
13*b*: straight ventilation passage
15: pipe
16: pipe
17: vacuum chamber
18: repeller electrode with mesh
19: extraction electrode
20: earth electrode
21: ion lens
22: ion deflection electrode
23: exhaust aperture
24: pulsed gas
25: ion beam orbit
26: reflectron flight time type mass spectrometer
27: ion reflection electrode
28: MCP
29: sample molecular ion
30: outer surface
31: mesh for repeller electrode
32: mesh for extraction electrode
33: mesh for earth electrode

34: pressure-time distribution of pulsed gas
35: pulsed gas
36: pressure-time distribution of pulsed gas
37: pulsed gas
38: pressure-time distribution of pulsed gas
39: pulsed gas
40: optimum laser beam irradiation positioning device
41: vacuum accordion tube
42: vacuum vessel
43: high speed ionization vacuum gauge
44: vacuum pump
45: driving device for pulsed gas ejecting device
46: driving device for the high speed ionization vacuum gauge
47: oscilloscope
48: flange
**48*a***: inner surface
**48*b***: gas contacting surface
**48*c***: recess
**48*d***: bottom
**48*e***: through hole
49: nozzle
**49*a***: talon
**49*b***: axial portion
50: elastic seal element
51: valve body
**51*a***: valve body lower portion
**51*b***: valve body upper portion
52: gas retention space
53: sheet surface
54: vacuum vessel
**54*a***: opening
55: cover element
**55*a***: recess
**55*b***: passage
**55*c***: passage
56: spacer
57: nozzle holder
58: valve body holder
59: gas flowing into ventilation passage
60: gas traveling in ventilation passage
61: pulsed gas
62: pulsed gas
63: pulsed gas
64: sheet surface
**64*a***: sheet surface
**64*b***: sheet surface
65: nozzle
**65*a***: nozzle with a divergent type ventilation passage
**65*b***: nozzle with a straight type ventilation passage
66: outer surface
**66*a***: outer surface of a nozzle
**66*b***: outer surface of a nozzle
67: gas stagnating portion
**67*a***: gas stagnating portion
**67*b***: gas stagnating portion
68: gas flowing through a ventilation passage
**68*a***: gas flowing through a ventilation passage
**68*b***: gas flowing through a ventilation passage
69: mirror set
70: mirror set
71: inlet opening
72: outlet opening
73: laser beam
74: repeller electrode (for single laser beam)
75: extraction electrode (for single laser beam)
76: mesh (attached to a repelller electrode for single laser beam)
77: mesh (attached to a extraction electrode for single laser beam)
78: column type laser beam on go-route formed by multi-surface mirror
79: laser beam on return-route formed by multi-surface mirror
D: diameter of the ventilation passage (m)
L: pulse length (full width half maximum length of pressure distribution) of pulsed gas (m)
$X_L$: distance between the outer surface 37 and the laser beam irradiation point (m)
h: height of gas flux flowing into the ventilation passage 13 (m)
$d_0$: diameter of gas flowing into the ventilation passage 13 (m)
M1, M2, . . . Mn: concave mirror
d: distance between concave mirrors
F: focus
f1, f2: focal length
Z: ionization zone

The invention claimed is:

1. A laser ionization mass spectrometer comprising pulsed gas ejecting means, a laser beam irradiation system, repeller and extraction electrodes and mass analyzing means characterized in that said pulsed gas ejecting means is provided with a valve for ejecting carrier gas containing sample molecules into a vacuum chamber in pulse mode, that said laser beam irradiation system irradiates laser beam to said carrier gas ejected into said vacuum chamber for selective photo reaction of said sample molecules in said carrier gas ejected into said vacuum chamber, that said repeller and extraction electrodes are arranged within said vacuum chamber and generate an electric field for extracting sample molecules formed by said photo reaction, that said mass analyzing means analyzes mass of sample molecular ions extracted by said repeller and extraction electrodes, that a valve of said pulsed gas ejecting means is set so that said pulsed gas has pulse length shorter than a distance from an ejecting position to said laser beam irradiation point to said carrier gas and that said laser beam irradiation system is set so as to irradiate laser beam to said carrier gas near a position whereat a leading portion gas of said pulsed gas translating in said vacuum chamber, i.e. a gas ejected before full opening of said valve, is overtaken by a faster flat portion gas, i.e. a gas ejected during full open of said valve.

2. The mass spectrometer as claimed in claim 1 characterized in that a laser beam irradiation positioning means is further provided for determination of laser beam irradiation position to said carrier gas flow by said laser beam irradiation system before analysis of said carrier gas containing said sample molecules, that said laser beam irradiation positioning means is provided with a high speed ionization vacuum gauge removably arranged at a crossing point of a carrier gas flow ejected from said pulsed gas ejecting means into said vacuum vessel and laser beam irradiated from said laser beam irradiation system and an oscilloscope for indicating a pressure time waveform of said carrier gas flow detected by said high speed ionization vacuum gauge, that said pulsed gas ejecting means is formed able to change its distance from said high speed ionization vacuum gauge arranged within said vacuum vessel and that a position whereat said pressure time waveform transitions from a flat-top trapezoidal pressure distribution with a flat portion to a triangular pressure distribution without said flat portion can be confirmed by oscilloscope observation of change in pressure time waveform of said carrier gas flow following change in position of said pulsed gas ejecting means.

3. A positioning method of laser beam irradiation to a carrier gas flow prior to mass analysis of sample molecular ions using a laser ionization mass spectrometer comprising a pulsed gas ejecting means, a laser beam irradiation system, repeller and extraction electrodes and mass analyzing means, said pulsed gas ejecting means ejecting carrier gas containing sample molecules into a vacuum chamber in a pulse mode, said laser beam irradiation system irradiating laser beam to said carrier gas containing said sample molecules and ejected into said vacuum chamber for selective photo-reaction of sample molecules in said carrier gas, said repeller and extraction electrodes being arranged within said vacuum chamber for generation of an electric field for extraction of sample molecular ions generated by said photo reaction and said mass analyzing means analyzing mass of sample molecular ions extracted by said repeller and extraction electrodes, comprising the steps of arranging said pulsed gas ejecting means at an initial position of said vacuum vessel, arranging a high speed ionization vacuum gauge at a cross point of said carrier gas ejected from said pulsed gas ejecting means into said vacuum vessel with laser beam irradiated from said laser beam irradiation system, ejecting in pulse mode said carrier gas flow from said pulsed gas ejecting means to said high speed ionization vacuum gauge at said initial position, detecting pressure of said carrier gas flow by said high speed ionization vacuum gauge, observing a pressure time waveform of said carrier gas by an oscilloscope, confirming presence of a flat portion in said waveform, moving stepwise said pulsed gas ejecting means from said initial position in a direction distant from said high speed ionization vacuum gauge, ejecting in pulse mode said carrier gas flow from said pulsed gas ejecting means to said high speed ionization vacuum gauge at respective positions in movement, detecting pressure of said carrier gas flow by said high speed ionization vacuum gauge, observing pressure time waveform of said carrier gas by said oscilloscope, confirming absence of said flat portion in said pressure time waveform of said carrier gas flow at any position observed by said oscilloscope and setting laser beam irradiation point to said carrier gas flow near a relative position of said gas ejecting opening of said pulsed gas ejecting means to said high speed ionization vacuum gauge when said flat portion is not observed.

4. The mass spectrometer as claimed in claim 1 characterized in that laser beam irradiation point (X) to said carrier gas flow is set to a range of $0.5X_L<X<1.5X_L$ wherein $X_L$ is a distance of a position whereat said pressure time waveform transitions from said flat-top trapezoidal pressure distribution to said triangular pressure distribution from said gas ejecting opening of said pulsed gas ejecting means.

5. The mass spectrometer as claimed in claim 1 characterized in that said pulsed gas ejecting means comprises a gas retention space connected to a supply source of carrier gas containing said sample molecules, a flange blocking between said gas retention space and said vacuum chamber, a nozzle, an elastic seal element and a valve body, characterized in that said nozzle is provided with a sheet surface supported by said flange and facing said gas retention space, an outer surface located on the opposite side of said sheet surface whilst facing said vacuum chamber and a ventilation passage extending through a gap between said sheet surface and said outer surface, that said elastic sealing element is arranged on said sheet surface of said nozzle and that said valve body is arranged within said gas retention space and displaceable between a closed position whereat said sheet surface is in contact with said sealing element for blocking said ventilation passage and an open position whereat said sheet surface leaves from said sealing element over a prescribed distance due to electro-magnetic driving for opening said ventilation passage of said nozzle and that a distance between said valve body and said sealing element at said open position is 0.25 or more times larger than a diameter of said ventilation passage of said nozzle on said sheet surface.

6. The mass spectrometer as claimed in claim 5 characterized in that said pulsed gas ejecting means is provided with adjusting means for changing said distance between said elastic element and said sheet surface of said valve body in response to thermal expansion of said elastic sealing element for maintenance of a prescribed gap between said sheet surface at said opening position of said valve body and said elastic sealing element even during said thermal expansion of said elastic sealing element.

7. The mass spectrometer as claimed in claim 6 characterized in that said adjusting means for changing said distance between said elastic sealing element of said pulsed gas ejecting means and said sheet surface of said valve body is means for moving said nozzle supporting said elastic sealing element in an axial direction with respect to said flange.

8. The mass spectrometer as claimed in claim 5 characterized in that a diameter of said ventilation passage of said nozzle on said sheet surface is set to be 0.75 mm or larger.

9. A The mass spectrometer as claimed in claim 5 characterized in that said ventilation passage of said nozzle is a divergent type ventilation passage which is constant in diameter in an area from said sheet surface to said outer surface and increases said diameter with a prescribed angle of divergence in an area from said prescribed position to said outer surface.

10. The mass spectrometer as claimed in claim 9 characterized in that said divergent type ventilation passage has a diameter of 0.75 mm or larger on said sheet surface.

11. The mass spectrometer as claimed in claim 9 characterized in that said divergent type ventilation passage is constant in diameter in an area before a prescribed position of one third or shorter of a distance from said sheet surface to said outer surface and increases said diameter with an angle of divergence in a range from 4 to 20 degrees in an area from said prescribed position to said outer surface.

12. The mass spectrometer as claimed in claim 5 characterized in that said laser beam irradiation point to said pulsed gas flow is a point distant from said outer surface of said nozzle over a distance longer than a pulse full width half maximum length of said pulsed gas flow.

13. The mass spectrometer as claimed in claim 1 characterized in that said repeller electrode is provided with a mesh able to pass said pulsed gas to said laser beam irradiation point and arranged between said pulsed gas ejecting means and said extraction electrode.

14. The mass spectrometer as claimed in claim 1 characterized in that said laser beam irradiation system is provided with a pair of confronting mirror sets each made up of a plurality of concave mirrors and that each said concave mirror is angled so as to form an aggregation region of laser fluxes at a laser beam irradiation point to said pulsed gas through sequential and reciprocal reflection of laser beam between a pair of mirror sets.

15. The mass spectrometer is claimed in claim 1 characterized in that said laser beam irradiation system is provided with first and second mirror sets each including a plurality of concave mirrors and laser beam guide means for inputting said laser beam into one of said first and second mirror sets and outputting said laser beam after prescribed times of reciprocal reflection between mirror sets, that each said concave mirror pertaining to said first mirror set is arranged so as to reflect said laser beam toward one corresponding concave mirror in said second mirror set, that each said concave mirror pertaining to said second mirror set is arranged so as to reflect laser beam incident from one corresponding mirror in said first mirror set to another concave mirror adjacent to said one concave mirror thereby moving said laser beam sequentially and continuously in a circumferential direction of said mirror set, that a laser beam reflected by one of each said concave mirror pertaining to said first mirror set and each said concave mirror pertaining to said second mirror set is a convergent laser beam and a laser beam reflected by another of each said concave mirror pertaining to said first mirror set and each said concave mirror pertaining to said second mirror set is a parallel laser beam, that a focal length of each said concave mirror is set so as to focus said parallel laser beam in a prescribed region between said two mirror sets and focus said convergent laser beam outside said prescribe region and that said laser beam of said parallel beam focuses at said laser beam irradiation point to said pulsed gas and that said prescribed region is formed wherein said laser beam of said convergent beam does not focus.

16. The mass spectrometer as claimed in claim 14 characterized in that said repeller and extraction electrodes are arranged with a sufficient gap not causing collision with said laser flux generated by the laser beam irradiation system and that said repeller and extraction electrodes have sufficient confronting surfaces which do not warp an electric field generated between said electrodes.

17. The mass spectrometer as claimed in claim 1 characterized in that said mass analyzing means is reflectron type flight mass analyzing device.

18. The mass spectrometer as claimed in claim 1 characterized in that laser beam irradiation positioning means is further provided for determination of laser beam irradiation position to said carrier gas by said laser beam irradiation system prior to analysis of said carrier gas containing said sample molecules, that said laser beam irradiation positioning means includes pressure measuring means and displaying means, that said pressure measuring means measures pressure at a cross point of said carrier gas flow ejected by said pulsed gas ejecting means into said vacuum vessel with laser beam irradiated from said laser beam irradiation system, that said displaying means displays a pressure time waveform of said carrier gas flow detected by said pressure measuring means, that said pulsed gas ejecting means is able to change its distance with respect to said cross point of said carrier gas flow irradiation to said laser beam within said vacuum vessel and that said pressure time waveform of said carrier gas can be confirmed by said displaying means as a position whereat said flat-top trapezoidal pressure distribution having a flat portion transitions into said triangular pressure distribution without said flat portion.

19. A laser beam irradiation positioning method to a carrier gas flow prior to mass analysis on a laser ionization mass spectrometer which includes pulsed gas ejecting means, a laser beam irradiation system, repeller and extraction electrodes and mass analyzing means, said pulsed gas ejecting means having a valve for ejecting in pulse mode said carrier gas containing sample molecules into a vacuum chamber, said laser beam irradiation system irradiating laser beam to said carrier gas containing said sample molecules and ejected into said vacuum chamber for selective photo reaction of said sample molecules in said carrier gas ejected into said vacuum chamber, said electrodes being arranged within said vacuum chamber and generating an electric field for extraction of said sample molecular ions generated by said photo reaction and said mass analyzing means analyzing mass of said sample molecular ions extracted by said electrodes characterized in that an overtaking position whereat a leading portion gas in said pulsed carrier gas ejected from said pulsed gas ejecting means and translating in said vaccum chamber, i.e. a gas ejected prior to full opening of said valve is overtaken by a faster flat portion gas, i.e. a gas ejected during full opening of said valve is obtained and that said laser beam irradiation point to said carrier gas flow is set near said over-taking position.

* * * * *